(12) United States Patent
Hirose

(10) Patent No.: US 10,346,234 B2
(45) Date of Patent: Jul. 9, 2019

(54) INFORMATION PROCESSING SYSTEM INCLUDING PHYSICAL MEMORY, FLAG STORAGE UNIT, RECORDING DEVICE AND SAVING DEVICE, INFORMATION PROCESSING APPARATUS, INFORMATION PROCESSING METHOD, AND COMPUTER-READABLE NON-TRANSITORY STORAGE MEDIUM

(71) Applicant: FUJITSU LIMITED, Kawasaki-shi, Kanagawa (JP)

(72) Inventor: Motoyoshi Hirose, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 176 days.

(21) Appl. No.: 15/439,978

(22) Filed: Feb. 23, 2017

(65) Prior Publication Data
US 2017/0262328 A1    Sep. 14, 2017

(30) Foreign Application Priority Data

Mar. 9, 2016   (JP) .................. 2016-045536

(51) Int. Cl.
| | |
|---|---|
| G06F 11/00 | (2006.01) |
| G06F 11/07 | (2006.01) |
| G06F 3/06 | (2006.01) |
| G06F 11/14 | (2006.01) |

(52) U.S. Cl.
CPC .......... *G06F 11/0778* (2013.01); *G06F 3/065* (2013.01); *G06F 3/067* (2013.01); *G06F 3/0619* (2013.01); *G06F 3/0644* (2013.01); *G06F 11/1435* (2013.01); *G06F 11/1451* (2013.01)

(58) Field of Classification Search
CPC ............ G06F 11/0778; G06F 11/1435; G06F 11/1451
See application file for complete search history.

(56) References Cited

U.S. PATENT DOCUMENTS

| | | |
|---|---|---|
| 2002/0029359 A1 | 3/2002 | Kiyoi et al. |
| 2009/0216967 A1 | 8/2009 | Sugawara |

(Continued)

FOREIGN PATENT DOCUMENTS

| | | |
|---|---|---|
| JP | H04-195565 A | 7/1992 |
| JP | 2002-073378 A | 3/2002 |

(Continued)

*Primary Examiner* — Michael Maskulinski
(74) *Attorney, Agent, or Firm* — Fujitsu Patent Center

(57) ABSTRACT

An apparatus including a physical memory partitioned into areas, a flag storage unit to store flags wherein a flag is set as indicating an area being updated when storage information stored in the area is updated, the area being associated with the flag, and a processor. The processor executes a first process of recording, when any fault does not occur, storage information stored in a first area to a recording device, the first area being associated with a first flag indicating the first area being updated, a process of saving, in a saving device, the storage information stored in the first area, and clearing the first flag so as to indicate the first area not being updated, and a second process of recording, to the recording device, storage information stored in a second area associated with a second flag indicating being updated when the fault occurs.

7 Claims, 23 Drawing Sheets

(56) References Cited

U.S. PATENT DOCUMENTS

| | | | | |
|---|---|---|---|---|
| 2012/0278525 A1* | 11/2012 | Serebrin | ............ | G06F 11/1451 |
| | | | | 711/6 |
| 2013/0346369 A1* | 12/2013 | Kondou | ............ | G06F 11/1458 |
| | | | | 707/642 |
| 2017/0277587 A1* | 9/2017 | Matsuzawa | ............... | G06F 9/46 |
| 2017/0357545 A1* | 12/2017 | Hashiguchi | ............ | G06F 11/34 |

FOREIGN PATENT DOCUMENTS

| | | |
|---|---|---|
| JP | 2009-205254 A | 9/2009 |
| WO | WO-2015116057 A1 * 8/2015 | .......... G06F 11/0778 |

\* cited by examiner

FIG. 10

| PA(47:30) | Address of PML4T (CR3) | PML4 (VA 47:39) | Dir.Ptr. (VA 38:30) | Address of PDPT (PML4E) | $D_{-1}$ (LAST TIME) | $D_{-2}$ (TIME BEFORE LAST) |
|---|---|---|---|---|---|---|
| 3FFFFh | | | | | | |
| ⋮ | | | | | | |
| 000000h | | | | | | |

| TIMER INTERRUPT TIME ||| AFTER DIRTY PROCESS ||||  CHANGE DURING EXECUTING TASK |||
|---|---|---|---|---|---|---|---|---|---|
| $D_0$ | $D_{-1}$ | $D_{-2}$ | DUMP | $D_0$ | $D_{-1}$ | $D_{-2}$ | $D_0$ | $D_{-1}$ | $D_{-2}$ |
| 0 | 0 | 0 | NO | 0 | 0 | 0 | 0/1 | 0 | 0 |
| 0 | 0 | 1 | NO | 0 | 0 | 0 | 0/1 | 0 | 0 |
| 0 | 1 | 0 | NO | 0 | 0 | 1 | 0/1 | 0 | 1 |
| 0 | 1 | 1 | NO | 0 | 0 | 1 | 0/1 | 0 | 1 |
| 1 | 0 | 0 | DUMP | 0 | 1 | 0 | 0/1 | 1 | 0 |
| 1 | 0 | 1 | NO | 1 | 1 | 0 | 1/0 | 1 | 0 |
| 1 | 1 | 0 | NO | 1 | 1 | 1 | 1/0 | 1 | 1 |
| 1 | 1 | 1 | NO | 1 | 1 | 1 | 1/0 | 1 | 1 |

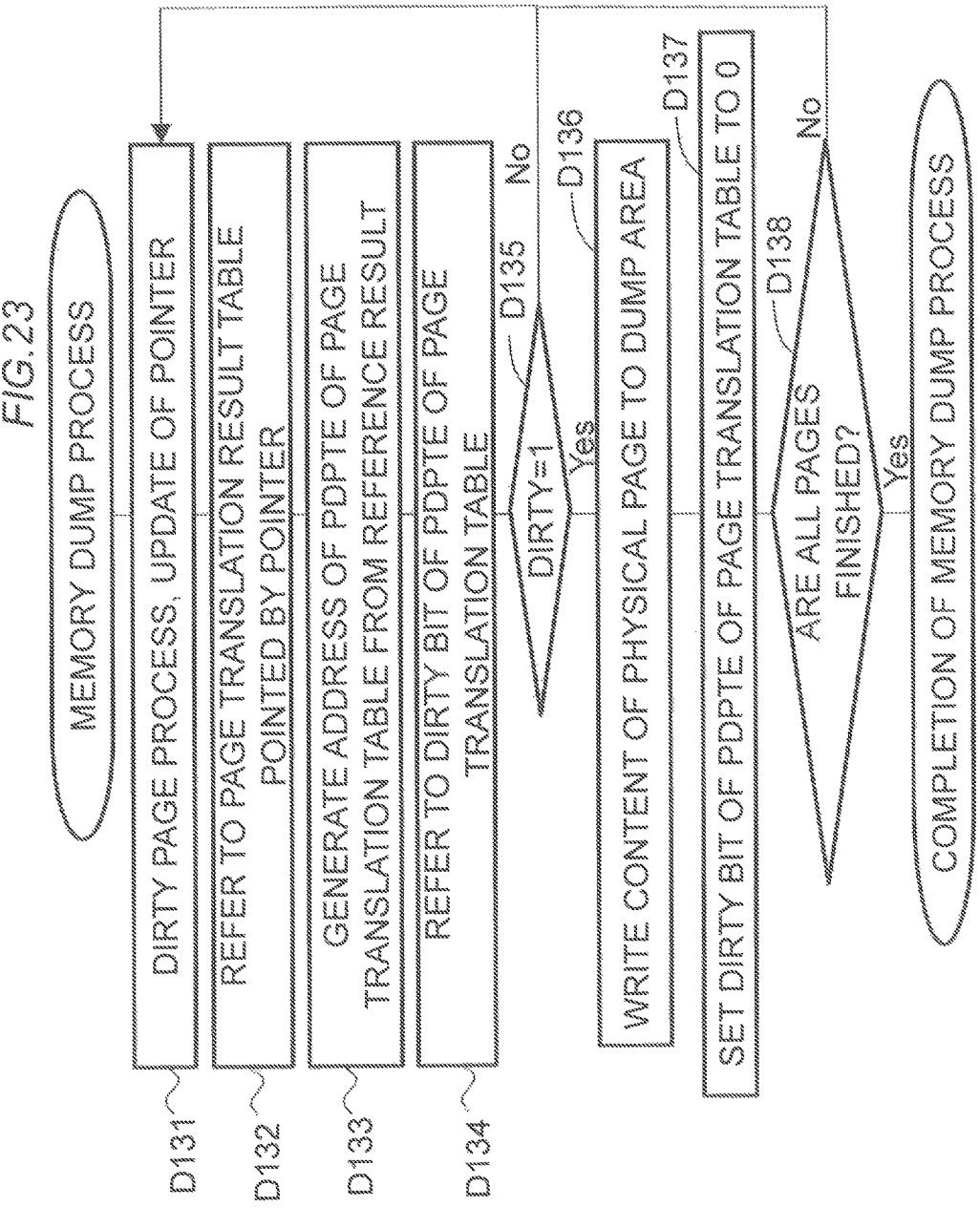

INFORMATION PROCESSING SYSTEM INCLUDING PHYSICAL MEMORY, FLAG STORAGE UNIT, RECORDING DEVICE AND SAVING DEVICE, INFORMATION PROCESSING APPARATUS, INFORMATION PROCESSING METHOD, AND COMPUTER-READABLE NON-TRANSITORY STORAGE MEDIUM

CROSS-REFERENCE TO RELATED APPLICATIONS

This application is based upon and claims the benefit of priority of the prior Japanese Patent Application No. JP2016-45536, filed on Mar. 9, 2016, the entire contents of which are incorporated herein by reference.

FIELD

The present invention pertains to an information processing system, an information processing apparatus, an information processing method, and a non-transitory recording medium storing a program.

BACKGROUND

A system called a mission critical system is exemplified by a system that is affected by an interruption and a stop derived from occurrence of a fault, e.g., a system used for performing a backbone task. A field of utilizing the mission critical system is called a mission critical field. An information processing apparatus instanced by a server operating in such a system, or an Operating System (OS) and other equivalent system software is or are provided with a memory dump function to enable the apparatus or the OS to cope with a variety of faults exhibiting different occurrence frequencies.

By the way, with developments of Central Processing Units (CPUs) and memory technologies over the recent years, there have been provided information processing apparatuses each having an on-board memory capacity reaching 12 TB at the maximum. With an increase in capacity of a Dual Inline Memory Module (DIMM), a rise of the on-board memory capacity will be anticipated from now onwards. Furthermore, as in the case of an in-memory database, software for effectively using the memory will spread, and an increase in the on-board memory capacity of an information processing apparatus will be also anticipated.

DOCUMENTS OF PRIOR ARTS

Patent Documents

[Patent Document 1] Japanese Patent Application Laid-Open Publication No. 2009-205254
[Patent Document 2] Japanese Patent Application Laid-Open Publication No. H04-195565
[Patent Document 3] Japanese Patent Application Laid-Open Publication No. 2002-73378

SUMMARY

An aspect of an embodiment is illustrated by an information processing system. The information processing system includes a physical memory to be partitioned into a plurality of areas and to store storage information. The system further includes a flag storage unit to store a plurality of flags wherein a flag is set as indicating an area being updated when storage information stored in the area of the plurality of areas is updated, the area being associated with the flag. The system yet further includes a recording device configured to record any of the storage information stored in the plurality of areas, a saving device configured to save any of the storage information stored in the physical memory as information in a virtual memory system and a processor.

The processor executes a first process of recording, when any fault does not occur, storage information stored in a first area to the recording device, the first area being associated with a first flag indicating the first area being updated and a process of saving, in the saving device, the storage information stored in the first area, and clearing the first flag so as to indicate the first area not being updated. The processor further executes a second process of recording, to the recording device, storage information stored in a second area associated with a second flag indicating the second area being updated when the fault occurs.

The object and advantage of the embodiment will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 10 is a diagram illustrating a structure of a page translation result table;
FIG. 16 is a diagram of a table depicting transitions of histories "$D_0/D_{-1}/D_{-2}$" of change bits (C)

FIG. 23 is a flowchart illustrating a memory dump process when the fault occurs according to the embodiment 2.

DESCRIPTION OF EMBODIMENT(S)

Figure 1:
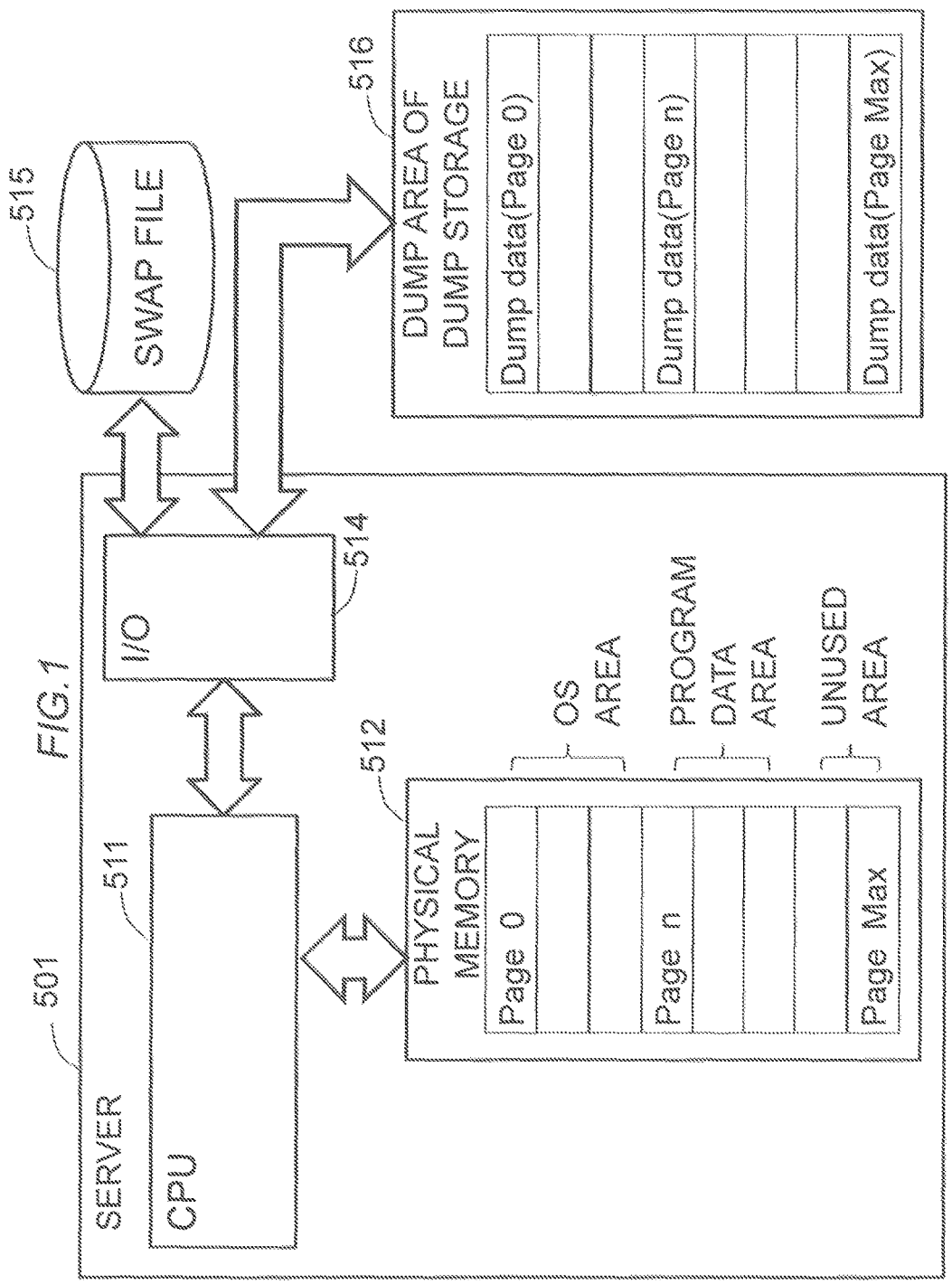
FIG. 1 is a diagram illustrating a configuration of a server according to a comparative example.

With the increase in memory loading capacity, it is presumed that a period of time for the memory dump will rise from now onwards. As a result, there will be elongated the time till rebooting the information processing apparatus after the occurrence of a fault in an information processing apparatus. Therefore, a reduction of the time for the memory dump has hitherto been tried to be attained by use of high-speed hardware. For example, such a method is proposed that a time for restarting up a system is reduced by sequentially dumping, at first, a memory area of an OS kernel and, after reloading the OS, other memory areas not yet dumped.

Adoption of the high-speed hardware can, however, become a factor for raising a cost. The method of dumping the memory area of the OS kernel and, after reloading the OS, other memory areas not yet dumped, entails a considerable period of time till finally obtaining a dumping result, and does not yet therefore attain a speed-up of the memory dump.

Under such circumstances, a present embodiment aims at speeding up a memory dump process without relying on an improvement of hardware performance.

The present information processing apparatus can speed up the memory dump process without relying on the improvement of the hardware performance.

An information processing system according to one embodiment will hereinafter be described with reference to the drawing. A configuration of the following embodiment is an exemplification, and the information processing system is not limited to the configuration of the embodiment 1. The information processing system adopts a virtual storage system, and has a swap file 15 (FIG. 5) corresponding to a memory area. The information processing system executes a process, which is a so-called memory dump, of writing information stored in the memory area to a dump area in order to analyze a fault when the fault occurs. The embodiment 1 exemplifies the information processing system that executes processes described below. (1) The information processing system previously writes, to the dump area, data loaded in a physical memory during a normal operation before the fault occurs. More specifically, the information processing system determines whether information in an area of the physical memory is updated, and periodically writes the updated information in the area of the physical memory to the dump area and also to the swap file 15. Through this process, the information processing system makes the information in the memory area coincident with the information in the swap file 15, and thus returns the area of the physical memory to a non-updated status. (2) The information processing system, upon the occurrence of the fault, selects the updated area, and writes the selected area to the dump area. The information processing system reduces a quantity of the write to the dump area upon the occurrence of the fault according to a procedure described above. In this case, the information in the area, not selected upon the occurrence of the fault, of the physical memory is information in an initial status or the information not updated after being saved in the swap file 15 but already written to the dump area. According to the procedure of the information processing system, it is therefore feasible to pre-acquire information including the information already written to the dump area at an early stage for analyzing the fault by selecting the updated area and writing the updated area to the dump area upon the occurrence of the fault.

COMPARATIVE EXAMPLE

Processes according to a comparative example will be described with reference to FIGS. 1 through 4. FIG. 1 illustrates a configuration of a server 501 by way of one example of the information processing system according to the comparative example. The server 501 includes a CPU 511, a physical memory 512, and an input/output (I/O) unit 514. A swap file 515 and a dump storage 516 are connected to the I/O unit 514. The physical memory 512 is partitioned into areas called pages. The physical memory 512 configures a main storage of a virtual storage system, together with the swap file 515. A write process called swap-out and a read process called swap-in are executed between the pages of the physical memory 512 and the corresponding pages of the swap file 515. In the virtual storage system, the pages on the physical memory are also called physical pages. The dump storage 516 has a dump area. The dump area is partitioned into dump data areas corresponding to the pages of the physical memory 512.

Figure 2:
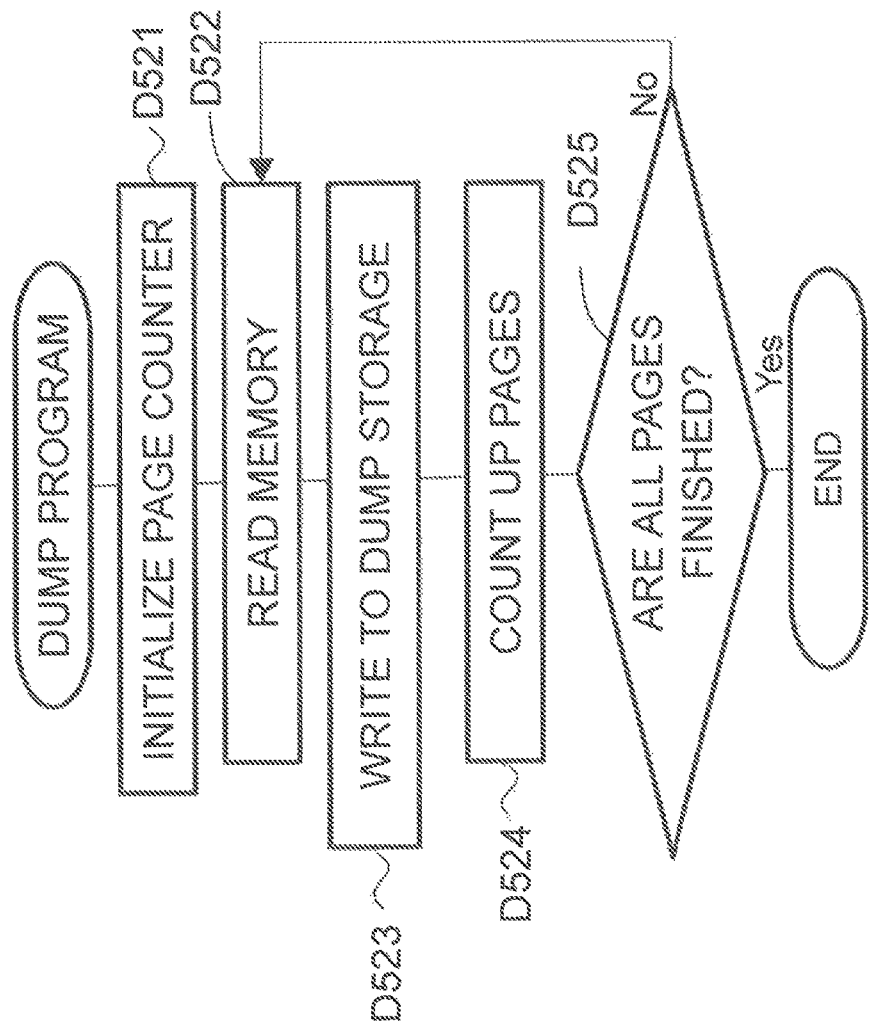
FIG. 2 is a flowchart illustrating processes of a dump program in the comparative example.

FIG. 2 illustrates processes of a dump program according to the comparative example. A start of the dump program is triggered upon the occurrence of the fault in the information processing system, i.e., the server 501. The CPU 511, which runs the dump program, at first, initializes a page counter (D521). The CPU 511 reads pages of the physical memory 512 corresponding to the page counter (D522). The CPU 511 writes the readout pages to the dump storage 516 (D523). The CPU 511 counts up the page counter (D524). The CPU 511 determines whether the reading of all the pages is finished (D525). When the reading of all the pages is not yet finished, the CPU 511 loops back to the process in S522. While on the other hand, when the page counter reaches the last page of the physical memory 512 and when finishing writing all the pages, the CPU 511 terminates the dump program.

Figure 3:
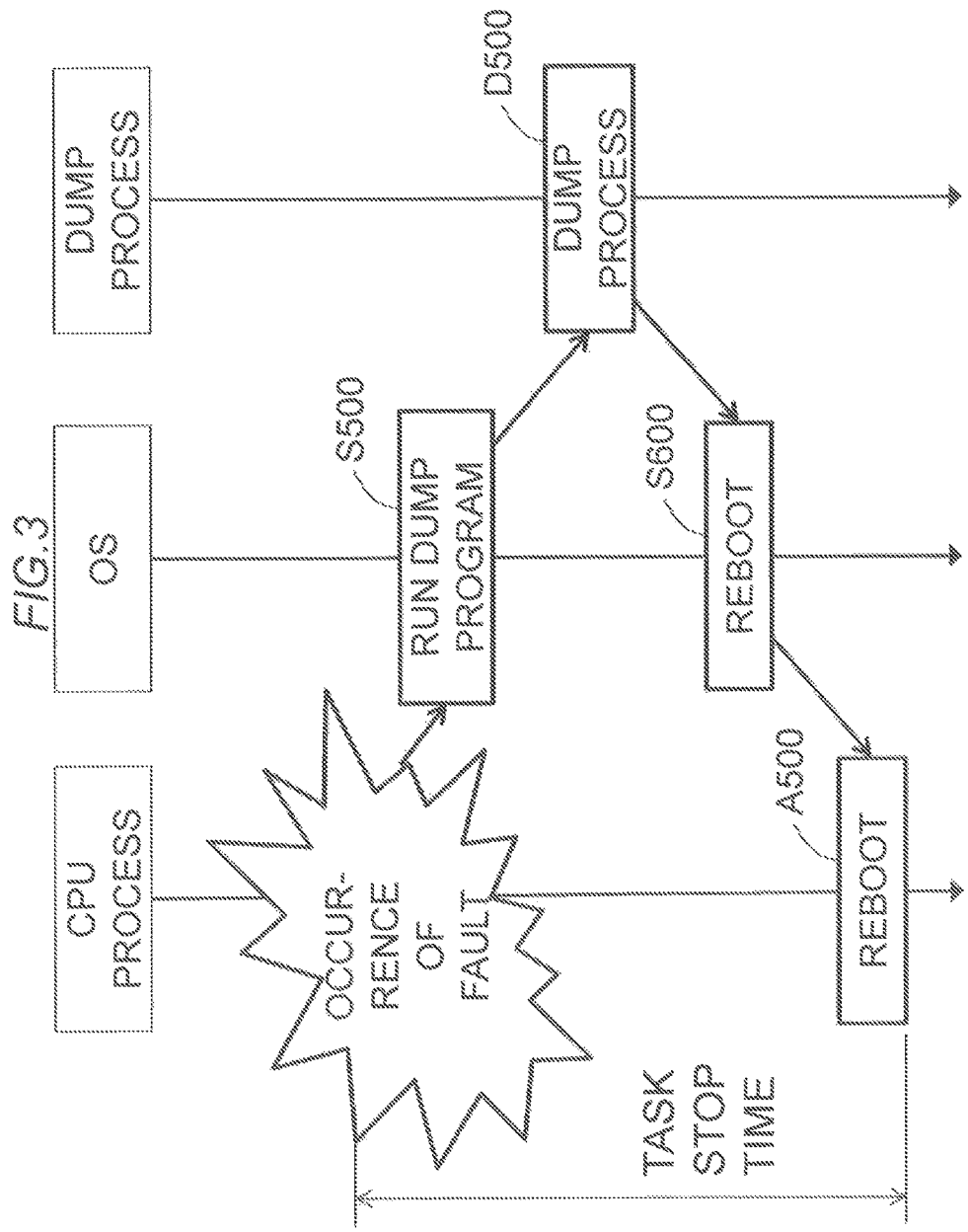
FIG. 3 is a diagram of a sequence till rebooting since occurrence of a fault in the server in the comparative example.

FIG. 3 depicts a sequence from the occurrence of the fault down to reboot in the server 501 according to the comparative example. The CPU 511 of the server 501 runs various categories of application programs to provide services, thereby supporting user's tasks. Upon the occurrence of the fault in the server 501, hardware of the CPU 511 detects and notifies the fault to the OS. The OS initiates the dump program (S500). The dump program executes a dump process (D500). After finishing the dump program, control returns to the OS, and the OS resets the hardware and gives a reboot instruction (S600). The server 501 starts rebooting (A500). Upon completion of the reboot, the server 501 resumes the support of the user's tasks.

In the processes described above, as a page count of the physical memory 512 increases, a runtime of the dump program gets elongated, resulting in a longer period of time of stopping the support of the tasks till the completion of the reboot since the occurrence of the fault. It is therefore considered that the dump program being initiated so far after the occurrence of the fault is run as a Process kept operating all the time during the task. The server 501 previously writes a content of the memory to the dump storage 516 by the Process that runs the dump program beforehand. By this Process, the server 501 reduces the processes of the dump program when the fault occurs. The initiation is performed at an interval of a fixed period of time using a timer so that the Process for previously running the dump program does not affect running a task application program. In other words, this scheme intends to limit a quantity of the write by running the dump program once.

Figure 4:
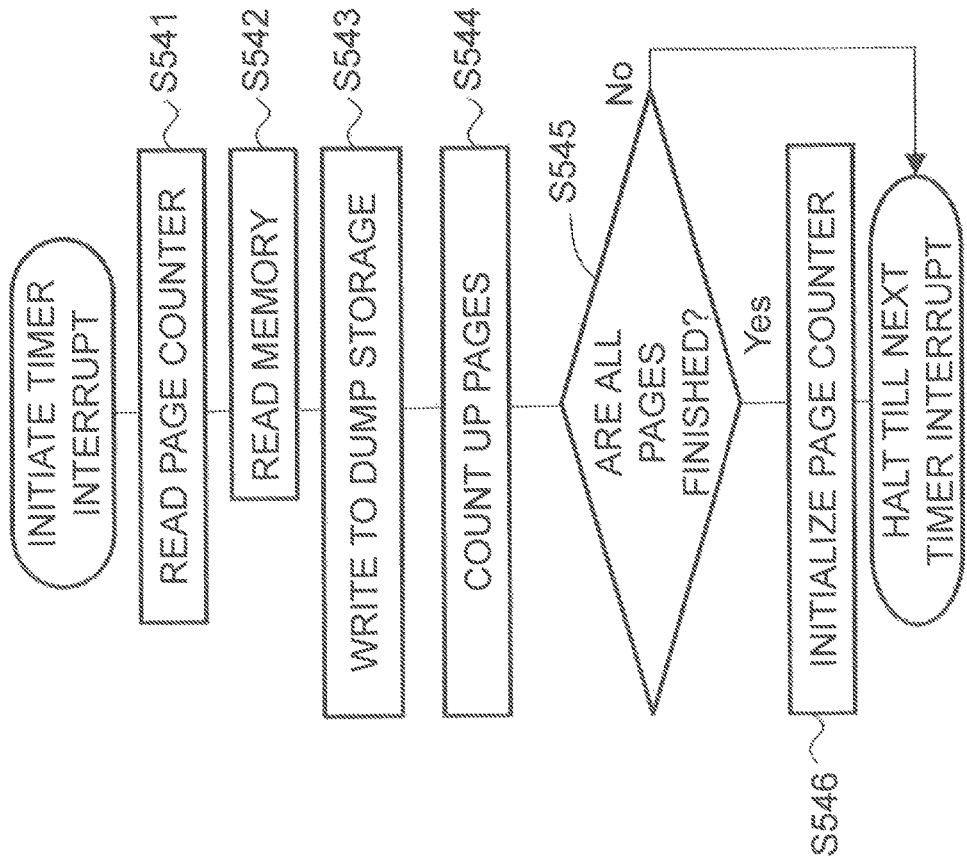
FIG. 4 is a flowchart illustrating processes of running the dump program beforehand.

FIG. 4 illustrates the Process that previously runs the dump program. The Process for the preliminary run is started up by a timer interrupt. In the Process for the preliminary run, the CPU 511, to begin with, reads a value of the page counter when finishing the last run (D541). The CPU 511 reads the pages of the physical memory 512 corresponding to the page counter (D542). The CPU 511 writes the readout pages to the dump storage 516 (D543). The CPU 511 counts up the page counter (D544). The CPU 511 determines whether the write of all the pages is finished (D545). When the write of all the pages is finished, the CPU 11 sets the page counter by initializing the value of the page counter to start processing from a head of the physical memory 512 at the next run. Whereas when the write of all the pages is not yet finished, i.e., when the page counter does not yet reach the last page of the physical memory 512, the CPU 11 directly terminates the dump program.

However, the dump program for the simple preliminary run as illustrated in FIG. 4 is unable to reduce such a possibility that the content of the memory, which has already been written to the dump storage 516, will have been rewritten up to when the fault occurs. This dump program is also unable to determine which pages are already dumped just when the fault occurs. This dump program is therefore insufficient in utility for implementing a memory dump which means outputting the memory content to a dump file in the simple preliminary process as in FIG. 4.

[Example of Improvement Against Comparative Example]

By the way, in a process triggering the memory dump for examining the fault, the memories, which are actually rewritten by executing the process, are not necessarily all of on-board memories. In other words, a ratio of the quantity of the memories to be rewritten concomitantly with executing a variety processes to a capacity of the on-board memories falls within a range of a certain degree. Accordingly, the pages of the physical memory 512 that are not yet rewritten, or the pages of the physical memory that are low in possibility of being rewritten are selected and dump-processed, thereby enabling an efficient preliminary dump.

In some of mainframe architectures, a change bit (C) exists in an area called a key storage associated with each page of the physical memory 512. The information processing system adopting this architecture includes hardware to rewrite the change bit (C) to "0→1" upon occurrence of the rewriting of the physical memory 512. The page with the change bit (C)=1 in the key storage is selected and written to the dump area by using this mechanism, thereby enabling a reduction in quantity of the write to the dump area of the dump storage 516 just when the fault occurs.

A processor other than the mainframe used in a Unix (registered trademark) server or a Xeon (registered trademark) architecture does not have the change bit of the key storage of the mainframe. In other words, the processors based on other architectures are not configured so that information equivalent to the change bit of the key storage takes a direct one-to-one correspondence to each of the pages of the physical memory 512. The Unix (registered trademark) server and the Xeon (registered trademark) architecture implement a Dirty bit (D) in a page translation table for translating a virtual address into a physical address. This Dirty bit (D) has a copy existing in a Translation Lookaside Buffer (TLB) within the CPU, and this copy is used also as a filter for not updating the Dirty bit (D) within the CPU each time the CPU gives a write command.

Such being the case, it may be sufficient that the processor based on the architecture implementing the Dirty bit (D) selects and writes the page with the Dirty bit (D)=1 to the dump area while referring to the Dirty bits in the page translation table upon the occurrence of the fault. The use of this Dirty bit enables attainment of the same dump process as the process using the change bit (C) corresponding to each page of the physical memory 512. The information processing apparatus other than the mainframe can also reduce the quantity of the write to the dump storage 516 just when the fault occurs.

The CPU 511 saves the pages of the physical memory 512 in the swap file 515 when the pages of the physical memory 512 are written to the dump storage 516. With an operation being thus done, the CPU 511 clears the change bit (C) or the Dirty bit (D), resulting in a null status of write or a clean status. With this clearance, supposing that the physical page is even rewritten afterward, a hardware circuit to set the change bit (C) changes the change bit (C) into an already written status. Hardware to manage the page translation table changes the Dirty bit (D) to a dirty bit (1) from a clean bit (0). In other words, an improved scheme is that the server 501 may simply divert the change bit (C) or the Dirty bit (D) to a flag for determining whether the change bit (C) or the Dirty bit (D) is already dumped.

The CPU 511 may also simply store update information of the Dirty bit (D) in the past, and may determine that a continuously updated page stores information exhibiting a high update frequency. It may be sufficient that the CPU excludes the physical page exhibiting the high update frequency from a preliminary dump processing target before the occurrence of the fault. This is because the physical page exhibiting the high update frequency has, even when being preliminary-dumped, a high possibility of being updated afterward, and also has a possibility of decreasing an effect of the preliminary dump. Thus, a load on the preliminary dump process in a normal status before the occurrence of the fault can be reduced by selecting the dump processing target. Embodiments 1 and 2 will hereinafter be described by way of examples of the improvement described above.

Embodiment 1

An information processing system according to the embodiment 1 will hereinafter be described with reference to FIGS. 5 through 17.

<Configuration>

Figure 5:
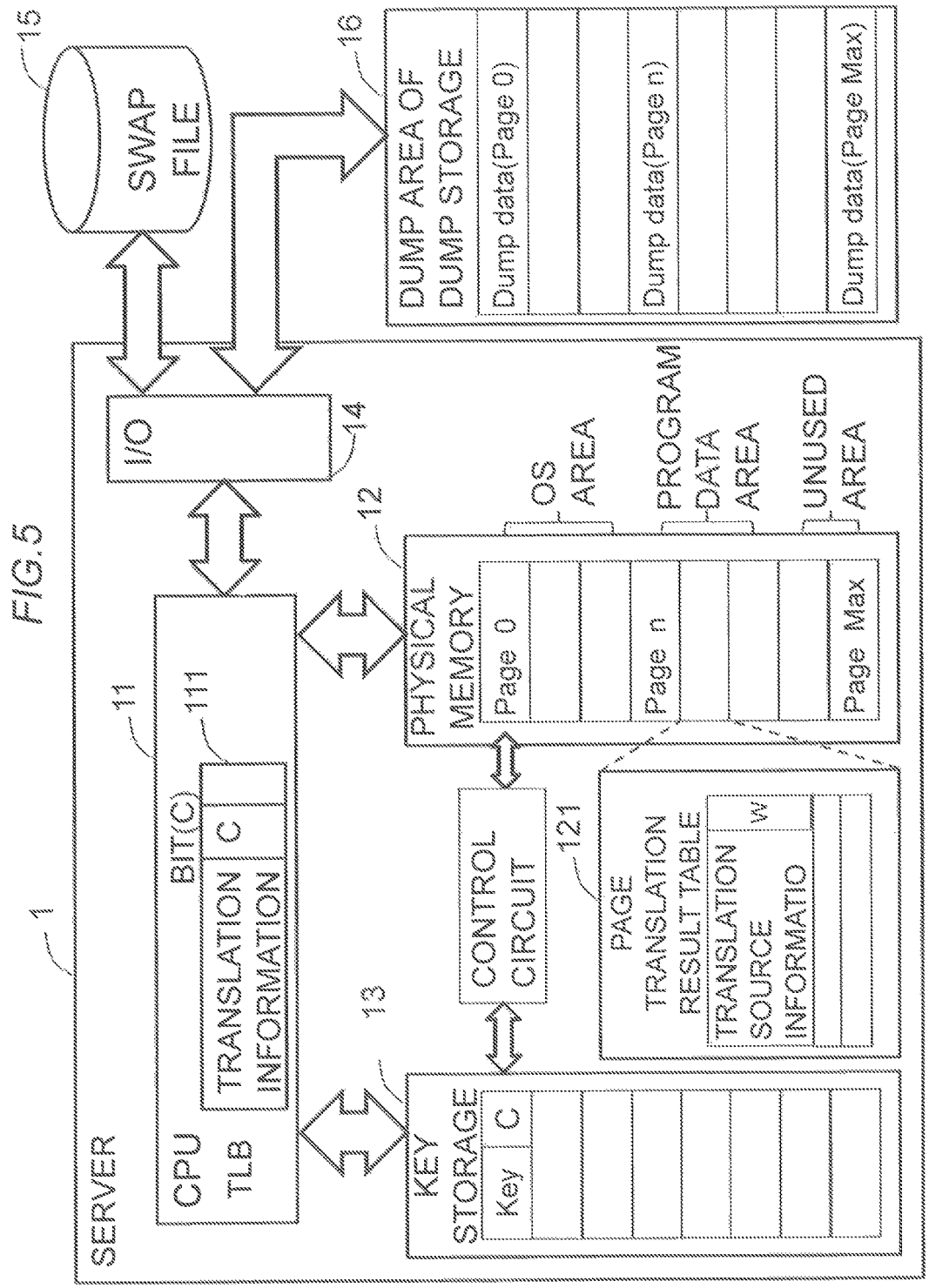
FIG. 5 is a diagram illustrating a configuration of the server according to an embodiment 1.

FIG. 5 is a diagram illustrating a configuration of a server 1 as one example of the information processing system according to the embodiment 1. The server 1 includes a CPU 11, a physical memory 12, a key storage 13, and an input/output (I/O) unit 14. Storage devices for a swap file 15 and a dump storage 16 are connected to the I/O unit 14. The CPU 11 is one example of a "processor". The CPU 11, the physical memory 12, the key storage 13 and the I/O unit 14 are one example of an "information processing apparatus". The CPU 11 executes an information processing method as processes of the information processing system or the information processing apparatus, based on a computer program deployed in an executable manner on a virtual memory provided by the physical memory 12 and the swap file 15.

The physical memory 12 is partitioned into the areas called the pages. The physical memory 12 is one example of a "physical memory partitioned into a plurality of areas". The physical memory 12 configures a main storage based on a virtual storage system together with the swap file 15. The physical memory 12 is partitioned into, e.g., an OS area, a program data area, and an unused area.

The server 1 includes a storage unit called the key storage 13 associated with the page of the physical memory 12. The key storage 13 has a Key and a change bit (C). The Key is used for protecting information stored in the page. The change bit (C) indicates whether the page is rewritten and updated. In an architecture used in the mainframe, the server 1 has hardware (control circuit) to update the change bit (C). To be specific, this control circuit rewrites change bit (C) to "1" from "0" with occurrence of writing of the physical memory 12. Note that a copy of the change bit (C) exists also in a Translation Lookaside Buffer (TLB) 111 within the CPU 11, and the CPU 11 performs control not to update the change bit (C) with futility against the write to the same page. The key storage 13 is one example of a "flag storage unit to store a plurality of flags wherein a flag is set as indicating an area being updated when storage information stored in the area of the plurality of areas is updated, the area being associated with the flag". The key storage 13 can be cleared by the OS. The change bit (C) of the key storage 13 is set in an already written status by a hardware control circuit operating together with a write access to the physical memory 12.

A page translation result table 121 is stored in the physical memory 12. The page translation result table 121 has entries associated with the pages of the physical memory 12, and each entry contains update frequency information W of the information stored in the page specified by a physical address. The update frequency information W is a history of readout values of the change bits (C) of the key storages 13 when the CPU 11 executes the dump process. Each time the CPU 11 reads the change bit (C) of the key storage 13 of a certain page, the change bit (C) of the same page illustrates being changed consecutively a plural number of times, in which case this page has a high change frequency and a high possibility of being rewritten and updated from now onward. Accordingly, the CPU 11 refers to the history of the change bit (C), then determines the update frequencies of the respective pages, and selects a dump processing target.

The swap file 15 and the dump storage 16, which are connected to the I/O unit 14, have the same configurations as those in the comparative example. The swap file 15 stores data of the pages in a virtual storage space, which are swapped out of the physical memory 12. The swap file 15 is one example of a "saving device configured to save any of the storage information stored in the physical memory as information in a virtual memory system". The pages read from the physical memory 12 in the dump process are written to the dump storage 16. A storage for storing the swap file 15 and the dump storage 16 may be the same storage device and may also be different storage devices. The dump storage 16 is one example of a "recording device configured to record any of the storage information stored in the plurality of areas".

<Sequence>

Figure 6:
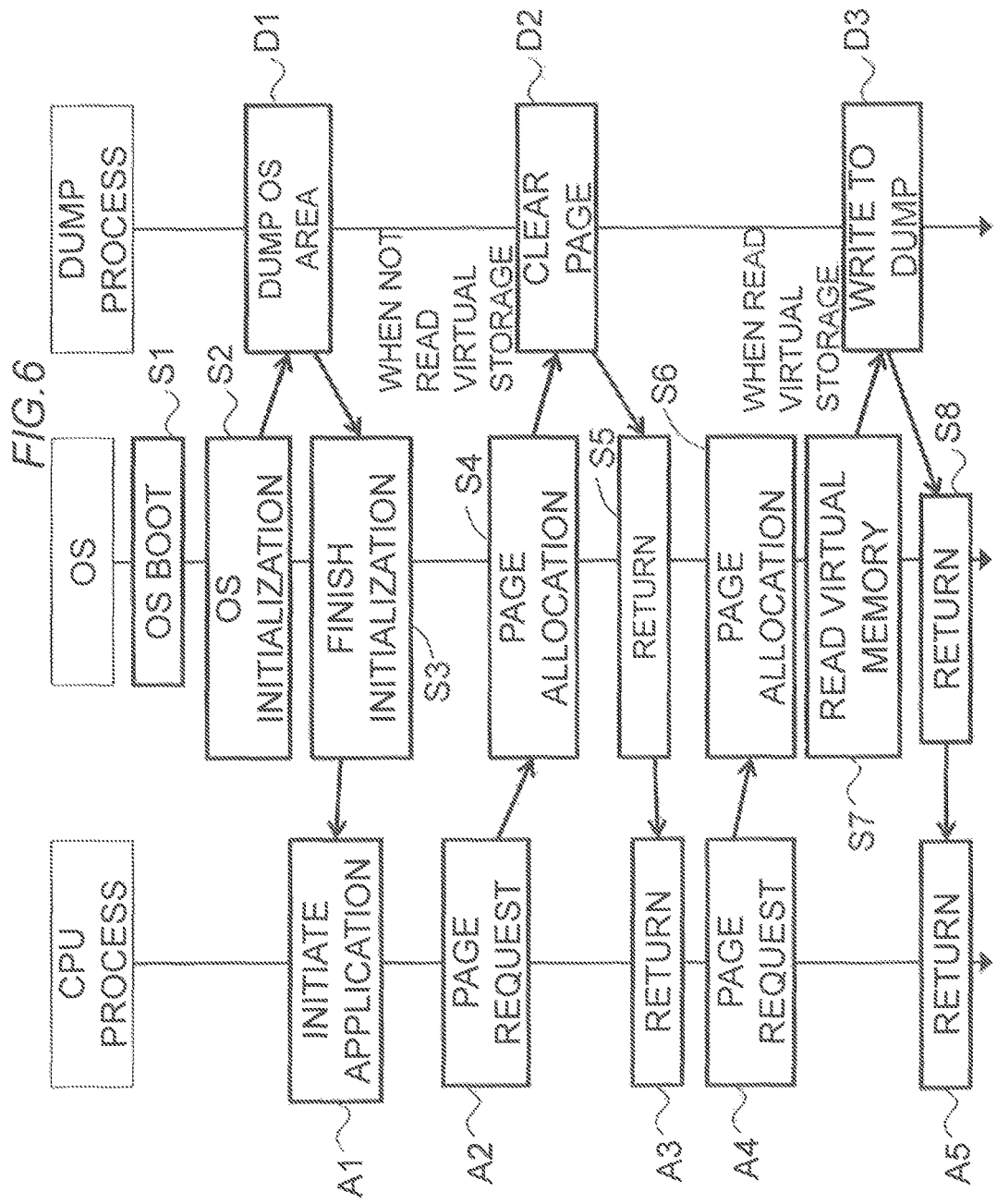
FIG. 6 is a diagram of an operation sequence at a normal time without the fault in the server.

An operation sequence at a normal time without any fault in the server 1 will be described with reference to FIG. 6. In FIG. 6, hardware processes mainly by the CPU 11 are described in a column "Process of CPU"; processes by the OS are described in a column "OS"; and processes by running the dump program are described in a column "Dump Process".

The server 1 boots the OS upon a startup by power-on and other equivalent events (S1). The OS, upon completion of booting, executes OS initialization (S2). According to the embodiment 1, the OS initialization involves setting the page translation table 120 illustrated in FIG. 9. According to the embodiment 1, after the completion of the OS boot, the OS initiates the dump process, and writes the physical memory 12, allocated for the OS to operate, to the dump area of the dump storage 16 (D1).

Thereafter, the server 1 terminates the initialization process (S3), and initiates the application program (A1). When the application program is initiated, the CPU 11 being on running the application program requests the OS for a page on a virtual storage (which will be termed a virtual page) of the main storage (A2). The OS executes an allocation process of allocating the physical page corresponding to the requested virtual page (S4). The requested page is a new page not receiving a reading action from the swap file 15 of the virtual storage, in which case the OS causes the dump program to execute a page clearing process (D2). In the page clearing process, the CPU 11 writes "0" to the allocated physical page (which will hereinafter be expressed by "0-clear" or "0-clearance"). The CPU 11 sets, to "0", the change bit (C) of the key storage 13 associated with the allocated physical page. In the embodiment 1, the CPU 11 performs the 0-clearance of the dump area of the allocated page at this time. The CPU 11 writes translation information of the corresponding page also to the page translation result table 121. After the page clearing process, the control returns to the OS (S5) and further to the application program of the CPU 11 (A3).

The CPU 11 being on running the application program further requests, e.g., the OS for the virtual page of the main storage (A4). Then, the OS executes the allocation process of allocating the physical page corresponding to the requested virtual page (S6). When the requested virtual page is a page saved in the swap file 15 that is already used in the virtual storage space, the OS reads this virtual page from the swap file 15 (S7). The process in S7 is called "swap-in". The OS writes the readout information of the virtual page to the allocated physical page. The OS initiates the dump program to cause the CPU 11 to execute the dump process of the page read from the swap file 15 (D3). The CPU 11 sets, to "0", the change bit (C) of the key storage 13 associated with the allocated physical page. Through the processes described above, the information read from the swap file 15 is stored in the physical page. To be specific, the information stored in the physical page is coincident with the information in the swap file 15, and comes to a non-updated status. The physical page is in the non-updated status, and it follows that the dump of the physical page is completed. Accordingly, the update to the physical page may not be done as it is till the occurrence of the fault, in which case it follows that this physical page is excluded from the dump process when the fault occurs. After the dump process in D3, the control returns to the OS (S8) and further to the application program (A5).

Figure 7:
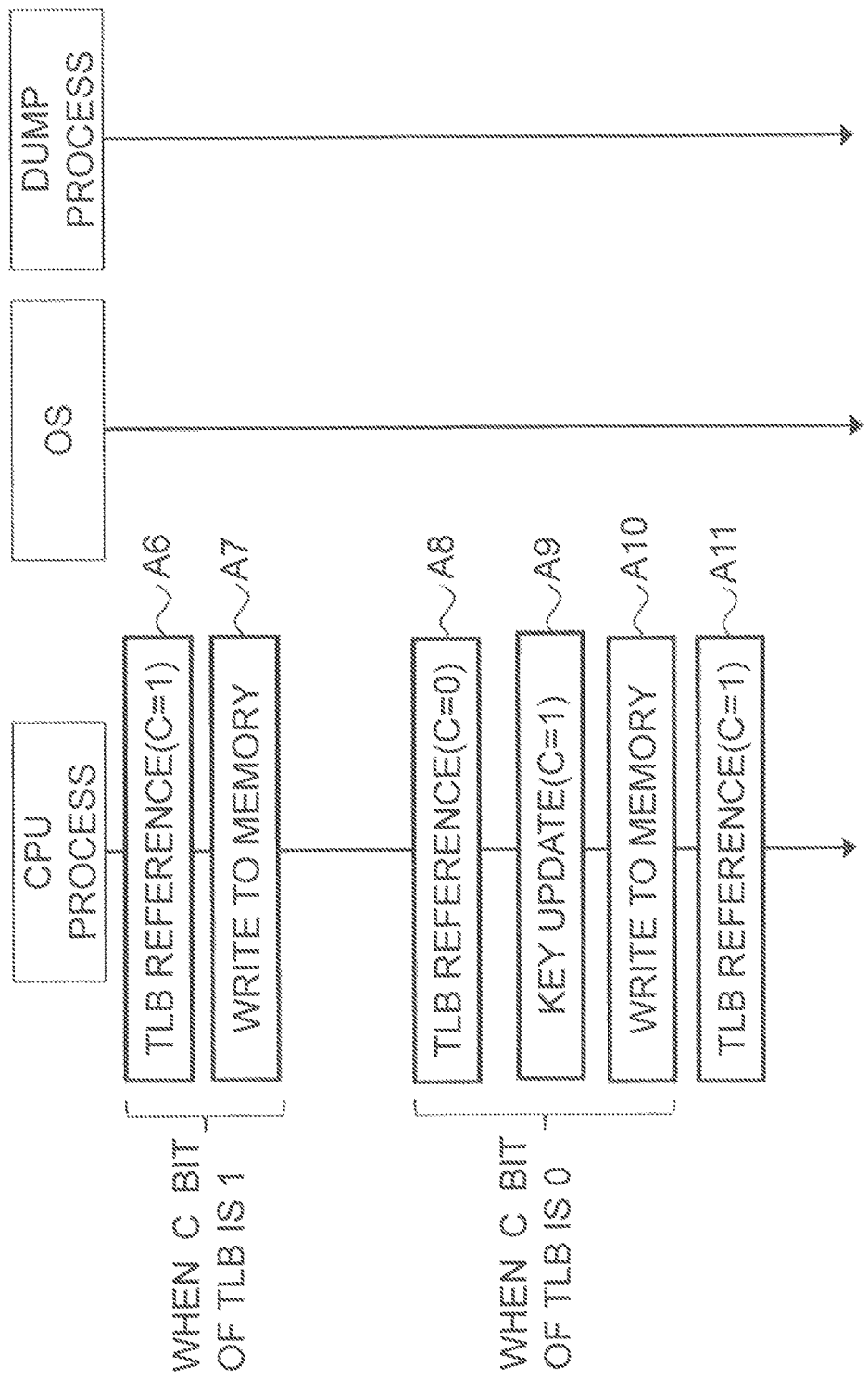
FIG. 7 is a diagram illustrating processes of a hardware circuit of a CPU in relation to a change bit.

FIG. 7 illustrates processes of the control circuit (FIG. 5) of the CPU 11 in relation to the change bit (C). When the write to the physical memory 12 occurs during executing the process of the application program, the control circuit of the CPU 11 refers to, at first, copy information of the change bit (C) copied to the TLB 111 (A6). As a result of referring to the TLB 111, the copy information of the change bit (C) indicates "1", i.e., an already changed status, in which case the CPU 11 executes writing as it is to the physical memory 12 (A7). While on the other hand, as a result of referring to the TLB 111 (A8), the copy information of the change bit (C) indicates "0", i.e., a non-written status, in which case the CPU 11 causes the control circuit to set the change bit (C) of the key storage 13 to the already written status (=1), and performs writing to the memory. Herein, the case that the copy information of the change bit (C) indicates "0" is a case that the physical page associated with the change bit (C) remains initialized or remains coincident with the swap file 15, and the subsequent write to the physical memory 12 is not yet executed.

Hereat, the CPU 11 sets also the copy information of the change bit (C) copied to the TLB 111 in the already written status (= 1) (A11). A timing of setting the copy information of the change bit (C) in the already written status is not, however, limited to the timing in A11 of FIG. 7. For example, the copy information of the change bit (C) may also be set in the already written status immediately after, e.g., the process (A8) of referring to the TLB 111 in FIG. 7.

In other words, the CPU 11 based on the architecture including the key storage 13 is equipped with the function of setting the update bit (C) of the key storage 13 to "1" when the CPU 11 performs writing to the memory, and hence the update bit (C) of the key storage 13 is rewritten into "1" as the CPU 11 performs writing to the memory. Note that the CPU 11 refers to the copy information of the change bit (C) copied to the TLB 111, thereby enabling the access count to the change bit (C) and the change count thereof to be reduced.

Figure 8:
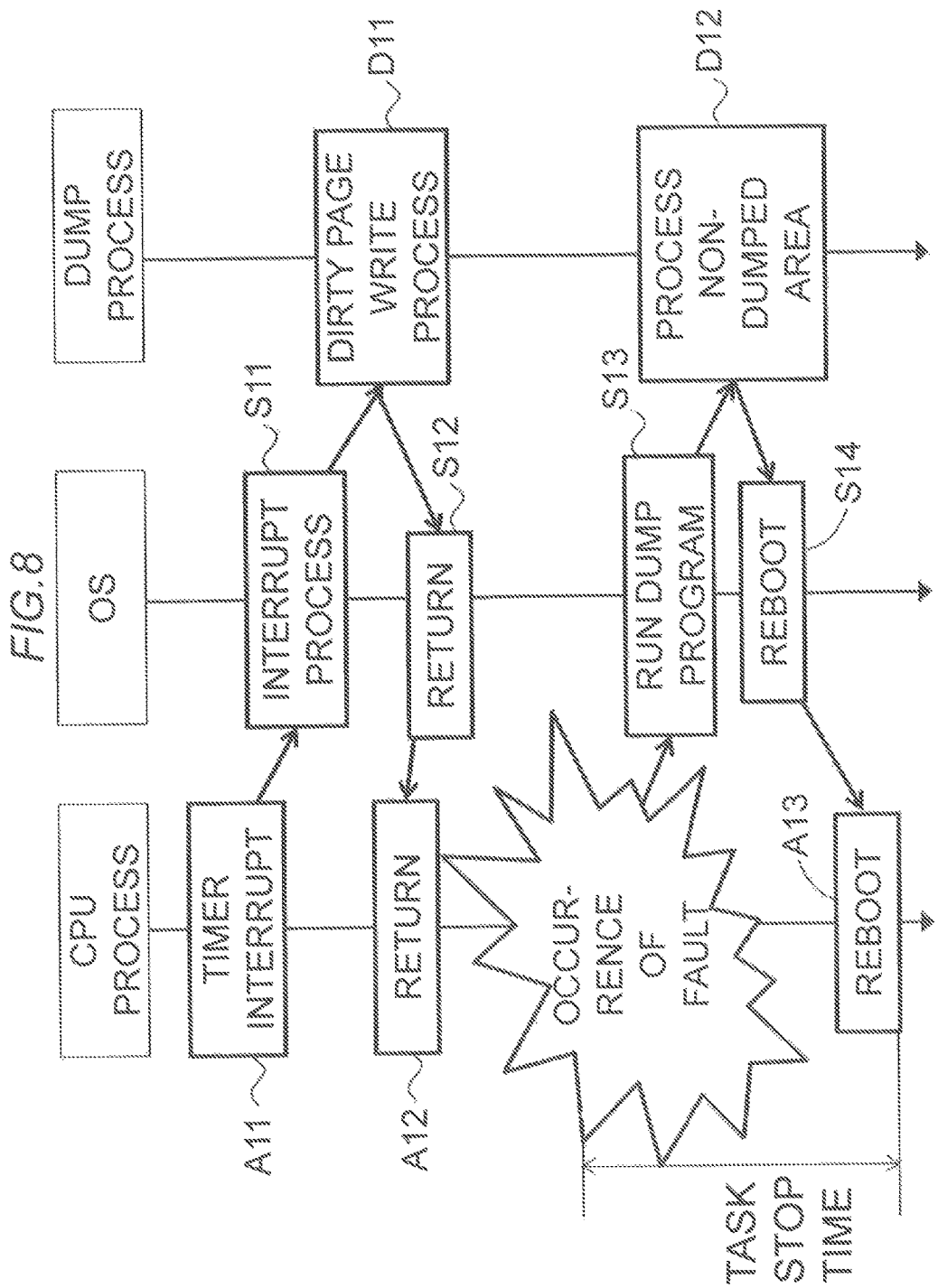
FIG. 8 is a diagram illustrating a preliminary dump process due to a timer interrupt and an example of a sequence of the dump process upon the occurrence of the fault.

FIG. 8 illustrates a sequence of the preliminary dump process due to the timer interrupt and a sequence of the dump process when the fault occurs. The OS gets the CPU 11 to cause the timer interrupt (A11), and, upon receiving the timer interrupt (S11), invokes a "dirty page write process" periodically (D11). In the "dirty page write process", the CPU 11 selects the physical page updated which is indicated by the update bit (C) of the key storage 13. In the embodiment 1, however, the CPU 11 determines the update frequency of the updated physical page, based on the history of the update bit recorded in the page translation result table 121. The CPU 11 excludes the pages exhibiting a higher update frequency than a reference value in the updated physical pages, and thus selects the physical page that is written to the swap file 15. The CPU 11 writes the selected physical page to the swap file 15 and also to the dump storage 16. In such a status that the physical page is thus coincident with the swap file 15, the relevant physical page is written also to the dump storage 16. The CPU 11, after the content of the swap file 15 has been coincident with the content of the physical memory 12, sets the update bit (C) of the key storage 13 to "0". The update bit (C) of the key storage 13 is set to "1" when the relevant physical page of the physical memory 12 is rewritten. Therefore, the case that the update bit (C) of the key storage 13 is "0" indicates that the physical page is coincident with the swap file 15, and indicates also that such a status is kept that the relevant physical page is written to the dump area as well. The CPU 11 excludes the pages exhibiting the higher update frequency than the reference value in the updated physical pages, and therefore such a possibility increases that the update bit (C) of the key storage 13 is kept being "0".

Next, the CPU 11 invalidates the TLB 111 within the CPU 11. The CPU 11 updates the history of the update bit recorded in the page translation result table 121. Thereafter, the control returns to the OS (S12) and further to the normal process of the application (A12).

In the CPU 11, when the fault occurs during running the application program, at first the OS initiates the dump function built in the OS (S13). The dump function (built in the OS) according to the embodiment 1 searches for the physical page with the update bit (C) of the key storage 13 being "1" (already updated status), and sets this physical page as a dump processing target (D12). The physical page associated with the update bit (C) being "1" (already updated status) is a physical page that is not yet dumped. Thereafter, the control becoming such that the OS is rebooted (S14) and further the application is reinitiated (A13).

In the embodiment 1, an implication of the "update bit (C)=0" is that the swap file 15 gets coincident with the content of the physical page by the dirty page write process in D11 and that the physical page is previously written to the dump area. The dump process excludes the physical page associated with the "update bit (C)=0". It therefore follows that the dump process, upon the occurrence of the fault, is executed limitedly to the physical page not dumped beforehand or the physical page rewritten after being dumped beforehand. As described above, the physical page exhibiting a low frequency of being previously rewritten is selected, with the update bit (C) being cleared, and is written to the swap file 15 and further to the dump storage 16. When the fault occurs, the dump process is effectively speeded up because of executing the process of the not yet dumped area. As a result, there is reduced a period of time till the server 1 reboots the OS and reinitiates the application program since the occurrence of the fault.

<Address Translation and Table Structure>

Figure 9:
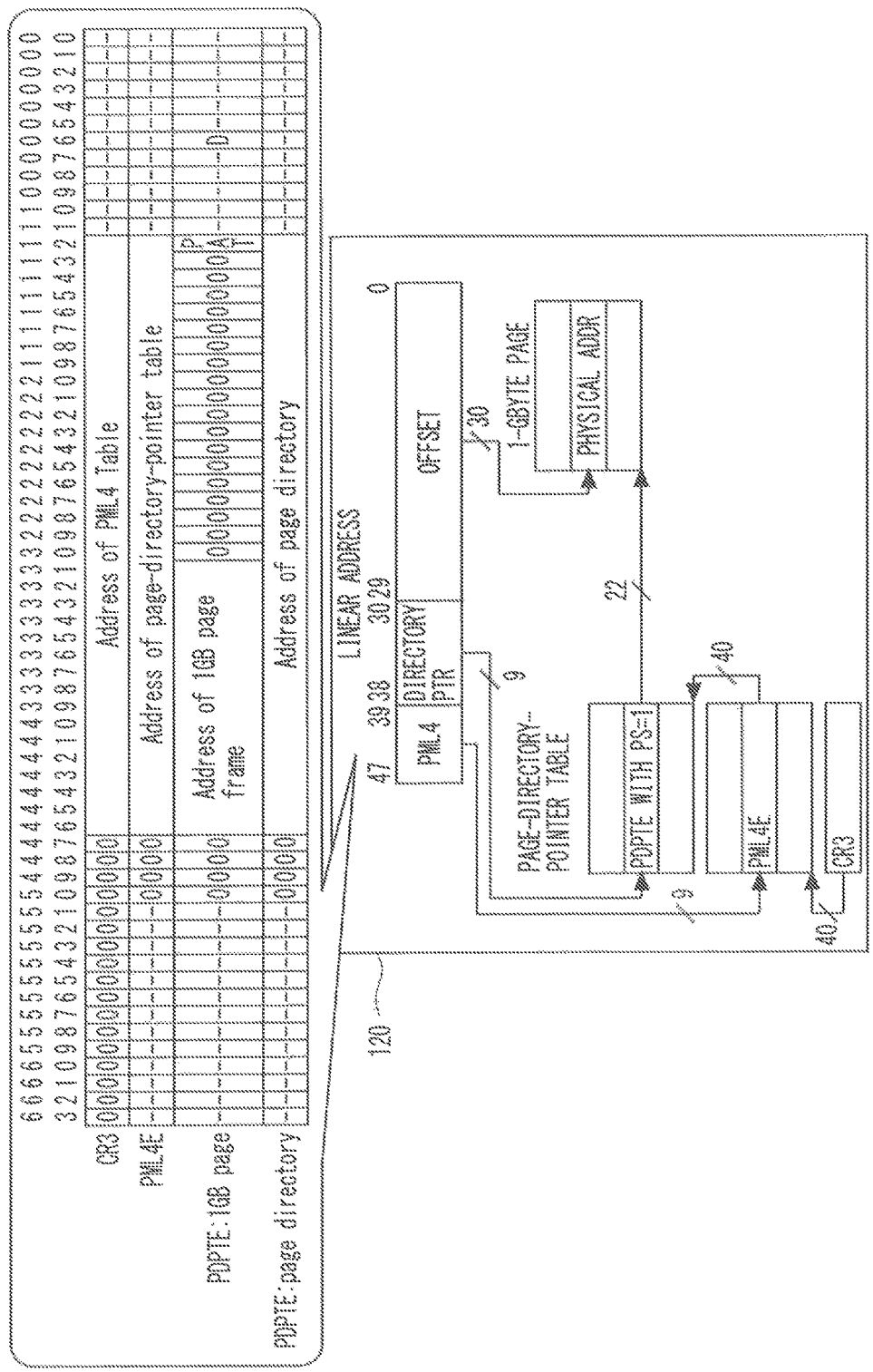
FIG. 9 is a diagram illustrating a structure of a page translation table.

FIG. 9 is a diagram illustrating a structure of the page translation table 120 for translating a virtual address (also termed a Linear Address) into a physical address. As in FIG. 9, the virtual address is, e.g., a 48-bit address (starting with "0" and ended with "47" (0th bit through 47th bit)), and has a Page-Map Level-4 (PML4)" field, a "Directory Ptr" field and an "Offset" field.

In the virtual address, the PML4 is an offset value on a PML4 table. A base address of the PML4 table is designated by a control register (CR3). A base address of a Page-Directory-Pointer Table (PDPT) is designated in an entry (PML4E) of the PML4 table, which is designated by the CR3 and the PML4.

In the virtual address, the Directory Ptr is an offset value of the PDPT. A base address of a 1-GByte Page table is stored in an entry (PDPTE) of the PDPT, which is designated by the base address in the PML4E and by the Directory Ptr.

In the virtual address, the Offset is an offset of the 1-GByte Page table. A physical address (Physical Addr) is stored in an entry of the 1-GByte Page table, which is designated by the PDPTE and the Offset. As described above, the page translation table 120 stores the items of information for translating the virtual address into the physical address allocated to this virtual address. Note that the CPU 11 retains a copy (TLB) of the page translation table 120 in a cache.

FIG. 10 is a diagram illustrating a structure of the page translation result table 121. The page translation result table 121 retains the history of the change bit (C) with respect to a couple of the physical page and the virtual page. The history of the change bit (C) is recorded each time the CPU 11 reads the change bit (C) in the dump process according to the embodiment 1. To be specific, the history of the change bit (C) is a chain of records indicating whether each page has a change in the case of iteratively executing the dump process. Let $D_0$ be a history of the current change bit (C) of the key storage 13 associated with the physical page, $D_{-1}$ be the change bit of the same page when executing the dump process last time, and $D_{-2}$ be the change bit of the same page when executing the dump process the time before last.

As in FIG. 10, each row of the page translation result table 121 is provided by being associated with a head address (PA(47:30)) of each physical page. Herein, the head address PA (47:30) is a high order 18-bit address exclusive of the offset of the physical address, and is associated with the physical page. Accordingly, a row count of the page translation result table 121 is the same as a page count of the physical pages.

In the example of FIG. 10, each row of the page translation result table 121 has a "base address (CR3) of PML4T" field, a "PML4 of virtual address" field, a "Directory Ptr of virtual address" field, a "base address of PDPT (PML4E)" field, a "history $D_{-1}$ of change bit (C)" field, and a "history $D_{-2}$ of change bit (C)" field.

Note that the physical pages are processed in the sequence of the physical pages when executing the dump process, and hence the base address (CR3) of the PML4T, the PML4 of the virtual address, the Directory Ptr of the virtual address and the base address (PML4E) of the PDPT may not be stored in the embodiment 1. In other words, as in FIG. 10, the histories $D_{-1}$ and $D_{-2}$ of the change bits (C) of the physical pages are stored by being associated with the respective physical pages. Therefore, the CPU 11 can read the histories $D_{-1}$ and $D_{-2}$ of the change bits (C) of the respective physical pages from the addresses of the physical pages. Accordingly, in the embodiment 1, it may be sufficient to provide a change bit history table structured by associating the addresses of the physical pages with the histories $D_{-1}$ and $D_{-2}$ of the change bits (C) of the respective physical pages in place of the page translation result table 121 in FIG. 10.

<Processing Flow>

Figure 11:
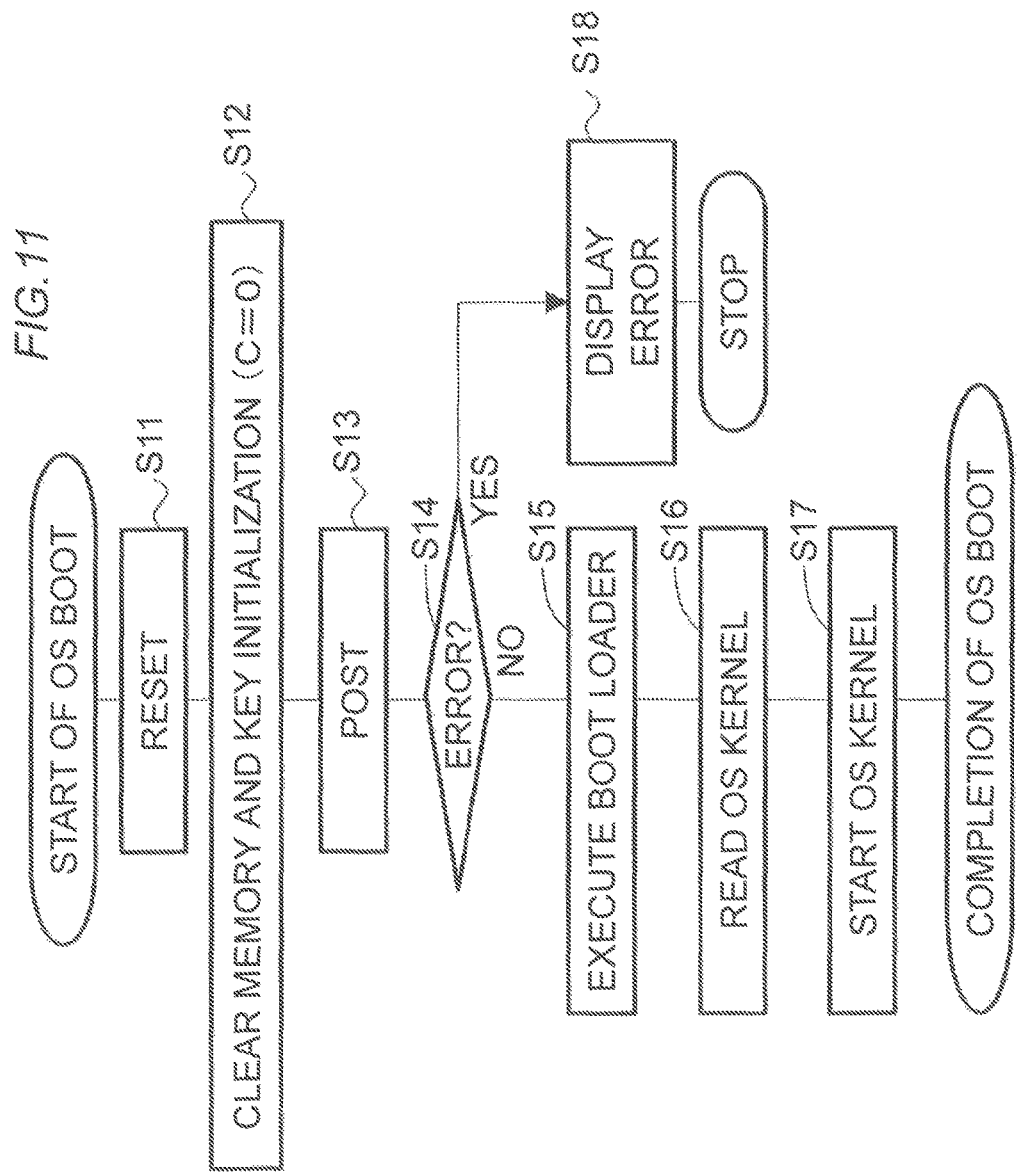
FIG. 11 is a flowchart illustrating details of an OS boot process (S1 in FIG. 6) in the embodiment 1.

FIG. 11 is a flowchart illustrating details of an OS boot process (S1 in FIG. 6) according to the embodiment 1. In this process, to start with, the CPU 11 receives a reset instruction from an operator or another equivalent person who presses a reset button (S11). The CPU 11 clears the physical memory 12 (S12). The CPU 11, along with clearing the physical memory 12, clears the change bit (C) of the key storage 13 associated with each physical page of the cleared physical memory 12.

Next, the CPU 11 performs a Power On Self Test (POST) (S13). When an error is detected by the POST, the CPU 11 displays the error (S18), and finishes the OS boot process.

Whereas when any error is not detected by the POST, the CPU 11 execute a boot loader (S15). The CPU 11 reads an OS kernel from a boot area, and deploys the kernel onto the main storage (S16). The CPU 11 starts a process of the OS kernel (S17).

Figure 12:
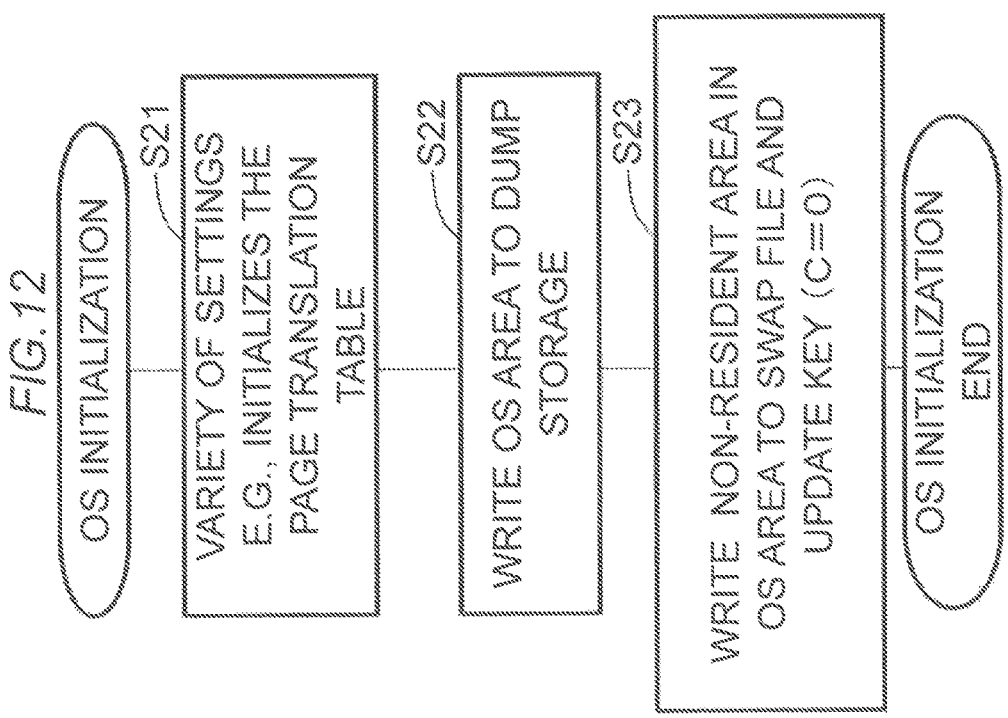
FIG. 12 is a flowchart illustrating details of an OS initialization process (S2 in FIG. 6)

FIG. 12 is a flowchart illustrating details of an OS initialization process (S2 in FIG. 6). In the OS initialization process, the CPU 11 conducts a variety of settings, e.g., initializes the page translation table 120 (S21). Subsequently, the CPU 11 writes the OS area to the dump storage 16 (S22). Next, the CPU 11 writes a non-resident area in the OS area to the swap file 15, and 0-clears the change bit (C) (S23).

Figure 13:
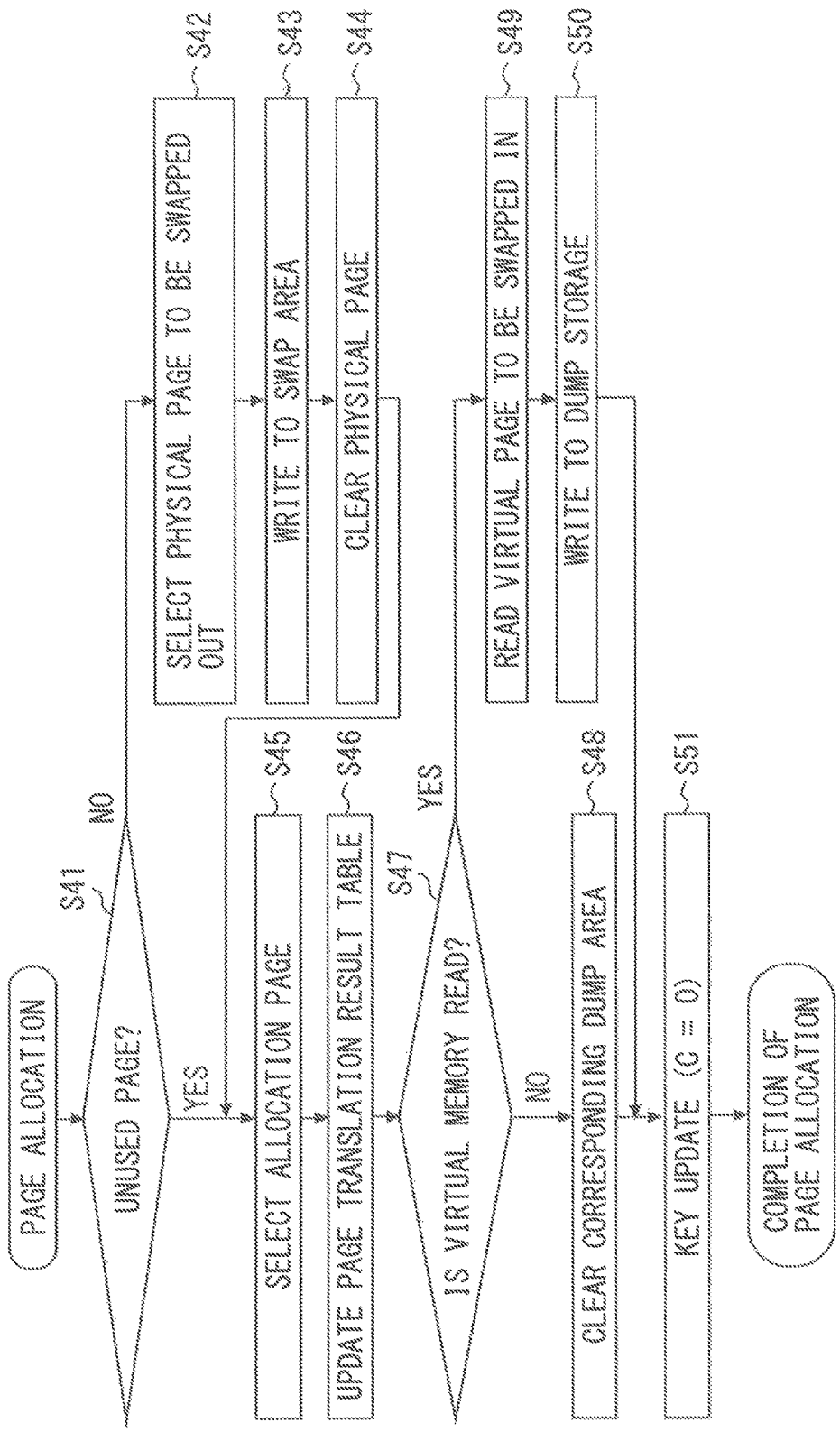
FIG. 13 is a flowchart illustrating details of a page allocation process (S4, S6 in FIG. 6)

FIG. 13 is a flowchart illustrating in detail a page allocation process (S4, S6 in FIG. 6). Processes in FIG. 13 will be, though being processes of the CPU 11 that runs OS codes, described as those executed by the OS. The OS, upon receiving a page allocation request (S4 in FIG. 6), determines whether an unused physical page exists (S41). When the unused physical page does not exist, the OS selects the physical page to be swapped out (S42). The OS writes the physical page to be swapped out to the swap file 15 (S43). The OS 0-clears the swapped-out physical page (S44). The OS selects the physical page to be allocated (S45). When there is no unused physical page in S41, the OS selects the swapped-out physical page.

Next, the OS accesses the entries of the page translation result table 121 to update the histories $D_{-1}$ and $D_{-2}$ of the change bits (C) by using the allocated physical page (S46). Subsequently, the OS determines whether the data retained in the virtual memory is to be read from the swap file 15 (S47). The case of being to be read from the swap file 15 is a case in which the relevant virtual page is not a new virtual page. In other words, the reading from the swap file 15 is a process of reading the virtual page that is already saved in the swap file 15. In the case of "the readout data not existing" in the determination of S47, the OS 0-clears the dump area associated with the allocated physical page (S48). While on the other hand, in the case of "the readout data existing" in the determination of S47, the OS reads the virtual page to be swapped in from the swap file 15 (S49). The OS writes data of the readout virtual page to the dump storage 16 (S50). The OS clears the change bit (C) of the key storage 13 (S51). This is because the data of the physical page is coincident with the data of the corresponding page in the swap file 15 at least when in the process of S51. The processes in S49 through S51 are one example in which "the processor ensures an area of the physical memory, corresponding to an area of a virtual memory in a virtual memory system, then records, when reading storage information saved in the saving device and associated with the area of the virtual memory, the readout storage information to the recording device, and clears the flag associated with the area of the physical memory associated with the area of the virtual memory".

Figure 14:
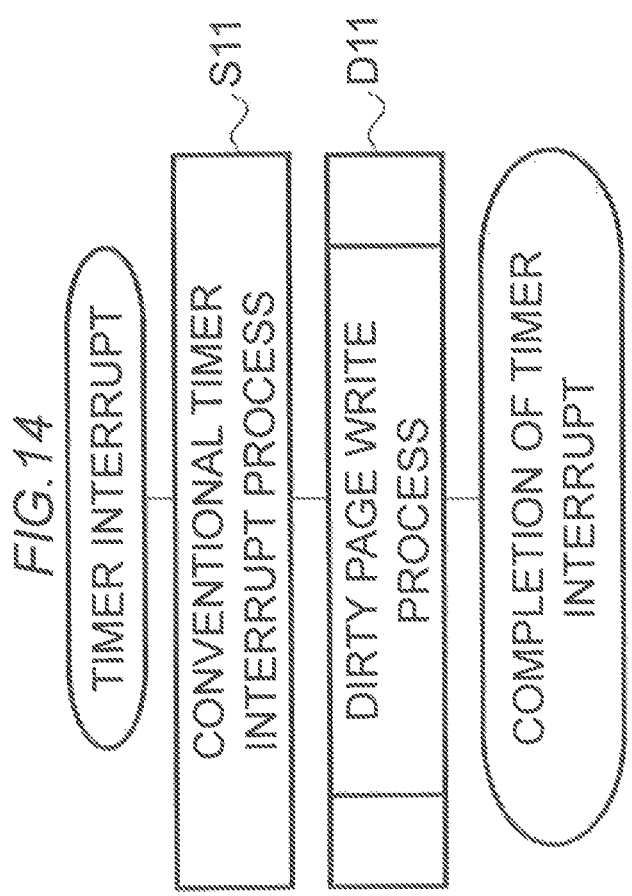
FIG. 14 is a flowchart illustrating details of a timer interrupt process (A11 and S11 in FIG. 8)

FIG. 14 is a flowchart illustrating in detail a timer interrupt process (A11 and S11 in FIG. 8). In this process, the timer interrupt occurs in the CPU 11 (S11), and the OS initiates a dirty page write process (D11).

Figure 15:
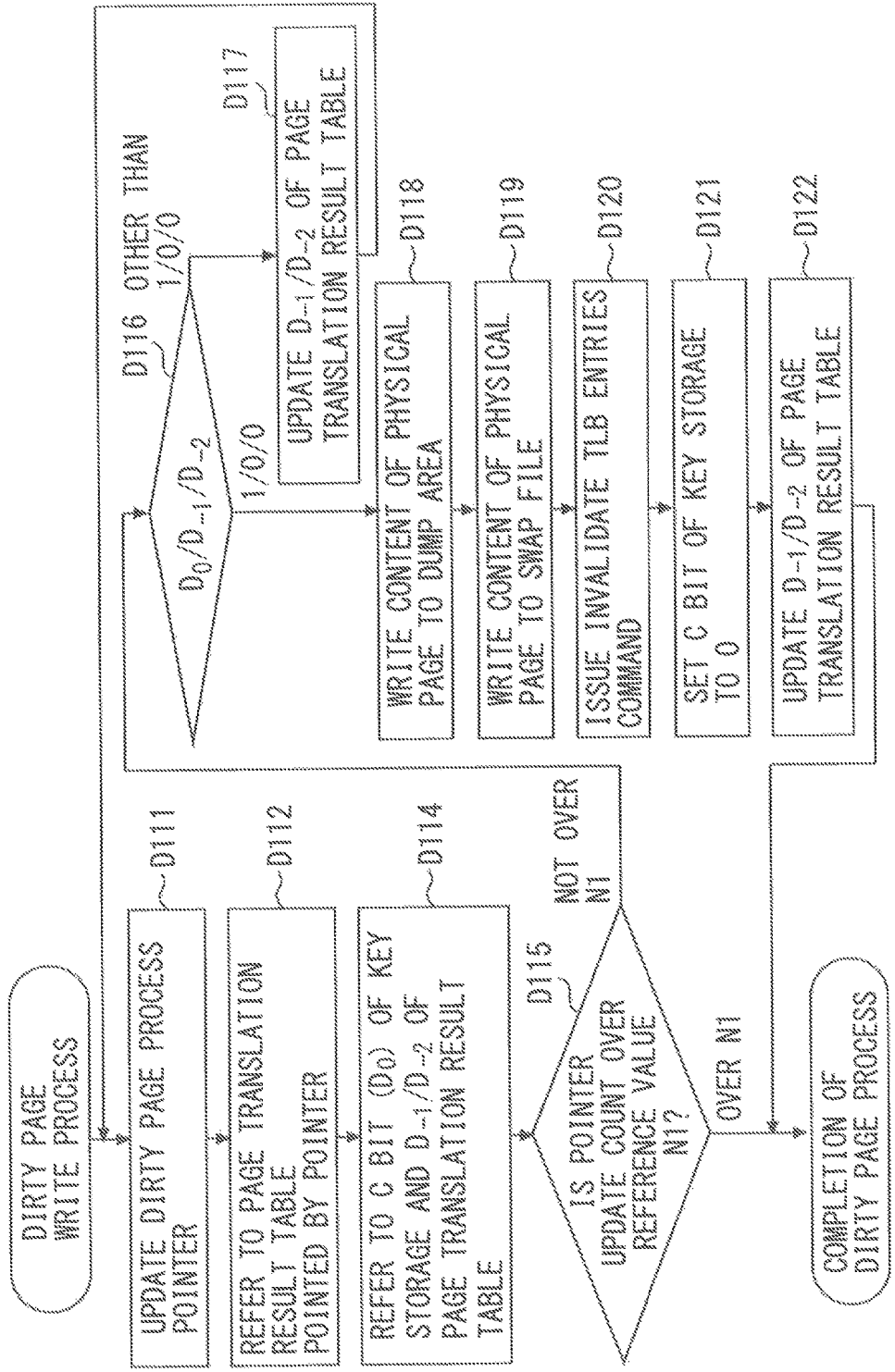
FIG. 15 is a flowchart illustrating a dirty page write process (details of D11 in FIG. 14)

FIG. 15 is a flowchart illustrating the dirty page write process (details of D11 in FIG. 14). The dirty page write process in FIG. 15 is started up by the timer interrupt in FIG. 14 and is therefore a process that is executed when any fault does not occur. In this process, the CPU 11 executes the process by using a dirty page process pointer that sequentially refers to the physical pages. When the dirty page write process is started up, the CPU 11 updates the dirty page process pointer (D111). Note that the dirty page process pointer is initialized to an initial value (the head address of the physical page) in executing the dirty page write process of the first time. The CPU 11 refers to the entries of the page translation result table 121 pointed by the dirty page process pointer (D112).

Next, the CPU 11 refers to the change bit (C) of the key storage 13 and "$D_{-1}/D_{-2}$" in the page translation result table 12 (D114). The CPU 11 determines whether the update count of the dirty page process pointer is equal to or larger than a reference value (N1) (D115). When the update count is smaller than the reference value, the CPU 11 determines a rewrite frequency shown by histories "$D_0/D_{-1}/D_{-2}$" of the change bits (C) (D116). Herein, "$D_0$" is the current change bit (C) itself. The histories "$D_0/D_{-1}/D_{-2}$" of the change bits (C) are other than "1/0/0", in which case the CPU 11 updates "$D_{-1}/D_{-2}$" of the page translation result table 121 (D117), and loops back the processing to D111.

The case that the histories "$D_0/D_{-1}/D_{-2}$" of the change bits (C) are other than "1/0/0" is a case in which the history "$D_0$" as the value of the current change bit (C) indicates "not rewritten", or a case in which the two or more histories of the change bits indicate "rewritten" with respect to the value of the current change bit (C) and the values of the change bits (C) in the past two dirty page write processes (in the three histories of the change bits). When the current change bit (C) indicates "not rewritten", the physical page associated with the key storage 13 may not be dumped to the dump storage 16. When at least a 2-change history exists in the current and two past histories of the change bit (C), the physical page associated with the key storage 13 may be said to have a high rewrite frequency and a high possibility of being rewritten in the future also. Such being the case, the CPU 11 updates "$D_{-1}/D_{-2}$" of the page translation result table 121 and loops back the processing to D111 without executing the dump process. The case that the histories "$D_0/D_{-1}/D_{-2}$" of the change bits (C) are other than 1/0/0 implies an area in which the update frequency is determined from the flag history to exceed a predetermined limit. The physical page associated with the change bit (C) having the histories "$D_0/D_{-1}/D_{-2}$" is one example of an "area with the update frequency being determined from a history of a set value of a flag associated with the area, the update frequency exceeding a predetermined limit". An event that the CPU 11 loops back the processing to D111 in the determination in D116 is one example in which "the processor does not execute the first process for an area with an update frequency being determined from a history of a set value of a flag associated with the area, the update frequency exceeding a predetermined limit upon reading the history of the set value of the flag".

Note that the determination of whether the update frequency exceeds the predetermined limit is made based on whether the histories "$D_0/D_{-1}/D_{-2}$" are 1/0/0 in the processes of FIG. 15. In other words, in addition to the current history "$D_0$", any one of the past two histories "$D_{-1}/D_{-2}$" exhibits the change, in which case the update frequency is determined to exceed the predetermined limit. According to the embodiment 1, it does not, however, mean that the determination of whether the update frequency exceeds the predetermined limit is not limited to the foregoing determination. For example, the CPU 11 may determine whether the update frequency exceeds the predetermined limit by using the past one history "$D_{-1}$" in addition to the current history "$D_0$". The CPU 11 may also determine whether the update frequency exceeds the predetermined limit by using the past three or more histories.

Whereas when the histories "$D_0/D_{-1}/D_{-2}$" of the change bits(C) are 1/0/0 in the determination of D116, the CPU 11 writes the content of the physical page to the dump area (D118). The case that the histories "$D_0/D_{-1}/D_{-2}$" of the change bits(C) are 1/0/0 is a case in which the value of the current change bit (C) indicates that the physical page is already rewritten, while the values of the change bits (C) indicates that the physical page is not rewritten in the past two dirty page write processes. When the histories "$D_0/D_{-1}/D_{-2}$" of the change bits(C) are 1/0/0, this indicates such a status that the physical page having a relatively low rewrite frequency is currently rewritten. Then, the CPU 11 writes the content of the physical page to the dump storage 16.

Next, the CPU 11 writes the content of the physical page to the swap file 15 (D119). In other words, the makes content of the swap file 15 coincident with the content of the physical memory 12. Subsequently, the CPU 11 issues an Invalidate TLB Entries command in order to invalidate the entries of the TLB, within the CPU 11, of the target physical page (D120). The CPU 11 0-clears the update bit (C)=$D_0$ of the key storage 13 (D121), and also updates the history of the update bit recorded in the page translation result table 121 (D122). The process in D118 is one example of "a first process of recording, when any fault does not occur, storage information stored in a first area to the recording device, the first area being associated with a first flag indicating the first area being updated". The process in D119 is one example of "saving, in a saving device, the storage information stored in the first area". The process in D120 is one example of "clearing the first flag so as to indicate the first area not being updated". The processes in D117 and D112 are one example of "a process of saving a history of a set value of each of the plurality of the flags".

The processes in D118 through D122 have a higher load than the process in D117. Such being the case, the CPU 11, after executing the processes in D118 through D122, finishes the dirty page write process. Accordingly, the load is reduced till a start of the next dirty page write process is triggered by the timer. The operation of triggering the start of the processes in FIG. 15 by the timer interrupt at the interval and finishing the dirty page write process after executing the processes in D118 through D112, is one example of "sequentially executing the first process per single area or per plurality of areas of the physical memory to restrict a load caused by one execution of the first process to the predetermined limit".

FIG. 16 is a table depicting transitions of the histories "$D_0/D_{-1}/D_{-2}$" of the change bits (C). The table illustrates the transitions of the histories "$D_0/D_{-1}/D_{-2}$" of the change bits (C) when performing the timer interrupt, when executing the dirty page write process ("after dirty" in FIG. 16) and during executing the task application program. Note that "when performing timer interrupt" is expressed by character strings "TIMER INTERRUPT TIME", "when executing dirty page write processing" is expressed by character strings "AFTER DIRTY", and "during executing task application program" is simply expressed by a character "DURING EXECUTING TASK" in the table of FIG. 16.

As in the table, the physical page becoming the dirty page write processing target is specified by "1/0/0" that are values of the histories "$D_0/D_{-1}/D_{-2}$" of the change bits (C) at the timer interrupt time. In any case, it is understood that the values "1/0" of the histories "$D_{-0}/D_{-1}$" of the change bits (C) at the timer interrupt time transition to the values "1/0 of the histories "$D_{-1}/D_{-2}$" after the dirty page write process. During executing the task application program, the value of the history "$D_o$" changes to "0" or "1 corresponding to an access state to the physical page.

Figure 17:
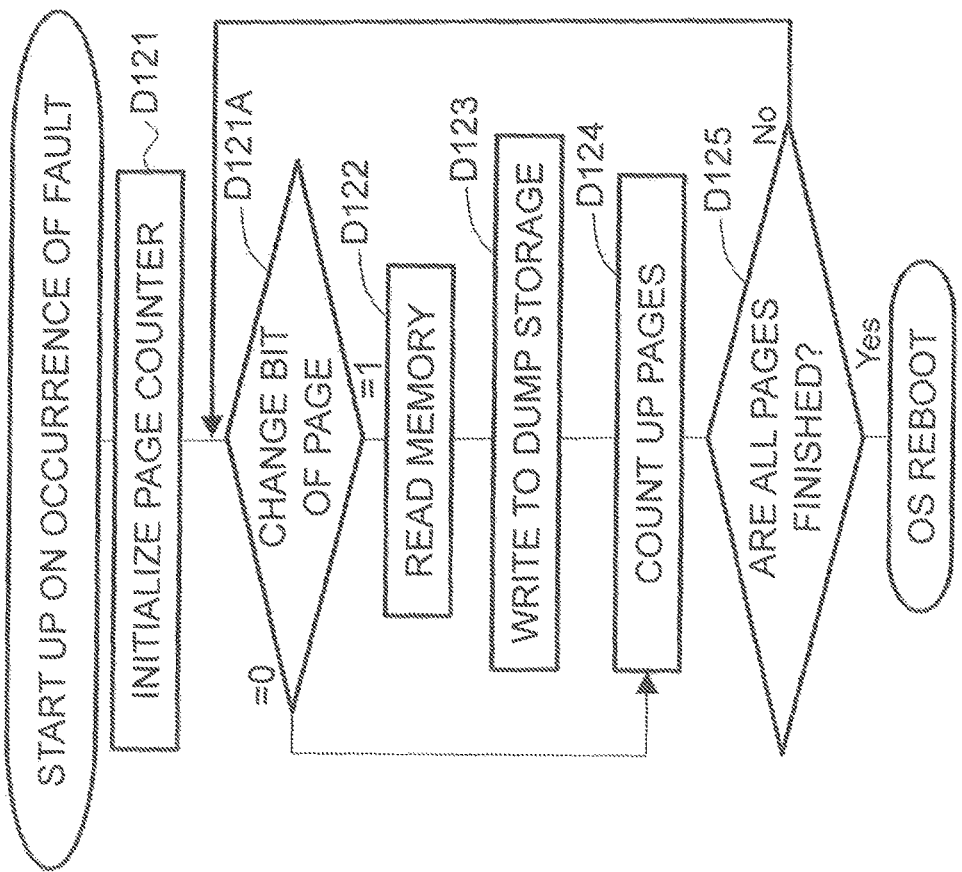
FIG. 17 is a flowchart illustrating the memory dump process when the fault occurs according to the embodiment 1.

FIG. 17 is a flowchart illustrating processes when the fault occurs. These processes are substantially the same as those in FIG. 2 according to the comparative example except a point of adding a determination process in S121A. To be specific, according to the embodiment 1, the CPU 11, after initializing the page counter (D121), determines whether the change bit (C) of the key storage 13 associated with the physical page is "1" (changed) (D121A) When the change bit (C) of the physical page is "1", i.e., when changed, the CPU 11 executes the dump process similarly to FIG. 2 (D122, D123). The processes in D122 and D123 are one example of "a second process of recording, to the recording device, storage information stored in a second area associated with a second flag indicating the second area being updated when the fault occurs". The status that the change bit (C) of the key storage 13 is "changed" is a status in which the data is written to the physical page after being initialized, or a status in which the data of the physical page is, after being temporarily dumped in the dump storage and written to the swap file 15, again rewritten. According to the embodiment 1, upon the occurrence of the fault, the CPU 11 selects the physical page and executes the dump process thereof when the change bit (C) of the key storage 13 associated with the physical page is set in the "changed" status. While on the other hand, when the change bit (C) of the physical page is "0", i.e., when not changed, this means that physical page is not changed or already written to the swap file 15, and hence the CPU 11 advances the processing to D124. Processes from D124 onward are the same as the processes from D524 onward in FIG. 2, and the repetitive explanations are therefore omitted.

Effect of Embodiment 1

As described above, when executing the OS boot process, the server 1 clears the physical memory 12 and also clears the change bit (C) of the key storage 13 (S12 in FIG. 11). In the initial status after booting the OS, the server 1 writes at least the OS area to the dump storage 16 and also the physical page storing the non-resident area to the swap file 15, and clears the change bit (C) of the key storage 13 associated with the physical page (S23 in FIG. 12). When the data of the physical page is coincident with the data of the corresponding page in the swap file 15 at the page allocation time, the server 1 clears the change bit (C) of the key storage 13 associated with the physical page (S51 in FIG. 13). The CPU 11 clears the change bit (C) of the key storage 13 when allocating a new page. Accordingly, when the data of the physical page is coincident with the data of the swap file 15, the change bit (C) remains non-updated (0). The CPU 11, when reading the data from the swap file 15 into the virtual memory at the page allocation time, writes the read data to the dump storage 16. It therefore follows that the physical page associated with the change bit (C) in the non-updated status (0) is 0-cleared into the initial status at the OS boot time, or that the content of the physical page is already written to the dump storage 16.

When in the normal operation with no occurrence of the fault, the CPU 11 executes the dirty page write process with the aid of the timer. In the dirty page write process, the CPU 11 selects and writes the rewritten physical page with the change bit (C) value=1 to the swap file 15 and also to the dump storage 16, and further implements the 0-clearance of the change bit (C). It therefore follows that when operating the server 1 before the occurrence of the fault, the physical page associated with the change bit (C) indicating the non-updated (0) status of the physical page is 0-cleared into the initial status at the OS boot time, or the content of the physical page is already written to the dump storage 16 according to the embodiment 1. Accordingly, supposing in this status that the dump process is even executed upon the occurrence of the fault, it may be sufficient that the CPU 11 selects the physical page with the change bit (C) being set in the updated (1) status, and executes the dump process (FIG. 17). The server 1 therefore can previously execute the dump process within an allowable and adequate range before the occurrence of the fault, and is thereby enabled to execute the dump process effectively at a high speed when the fault occurs.

In the server 1, the CPU 11 writes the content of the physical page to the dump area, and makes the content of the physical page coincident with the content of the swap file 15 (D118,D119 in FIG. 15). The CPU 11 clears the change bit (C) (D121 in FIG. 15). Accordingly, when the change bit (C) is in the no-change (0) status, this means that the physical page is in the initial status or already written to the swap file 15, and it can be determined that the CPU 11 may simply select the physical page with the change bit (C) indicating the changed (1) status and execute the dump process thereof when the fault occurs.

In the server 1, the CPU 11 selects the physical page specified by such an entry that the histories "$D_0/D_{-1}/D_{-2}$" of the change bits (C) are 1/0/0, and implements dumping this selected physical page beforehand. The physical pages with the histories "$D_0/D_{-1}/D_{-2}$" being other than 1/0/0 exhibit the high rewrite frequency and have, even when dumped beforehand, the possibility of being rewritten afterward. Such being the case, the CPU 11 of the server 1 executes the preliminary dump process limited to the physical pages having a possibility that dumped results remain in the physical pages after being dumped beforehand. In other words, at the stage of the preliminary dump based on the dirty page write process, the CPU 11 can avoid a futile dump process to improve the efficiency of the dump process, and can reduce the system load caused concomitantly with the preliminary dump process.

In the dirty page write process according to the embodiment 1, the CPU 11 restricts the processing load on the dump process in one timer initiation so as not to increase the load caused concomitantly with the dump process. For example, the CPU 11 limits, to a reference value (N1), a determination count of determining whether the change bit (C) of the physical page is changed. The CPU 11, when executing the write process once to the dump area of the dump storage 16 as in FIG. 15, finishes the dirty page write process, and waits till a next timer initiation. Thus, the CPU 11 restricts the processing load on the dump process to load within one timer initiation, and is thereby enabled to operate the server 1 stably.

In the embodiment 1, the server 1, when in the swap-in process, writes the swapped-in page to the dump storage 16, and clears the change bit (C) (S49 through S51 in FIG. 13). The server 1 is thereby enabled to execute the preliminary dump along with the swap-in process.

Embodiment 2

A server 1A defined as an information processing system according to an embodiment 2 will be described with reference to the drawings in FIGS. 18 through 23. The server 1 according to the embodiment 1 speeds up the dump process by using the change bit (C) of the key storage 13 associated with the physical page, which is adopted in the processor based on the mainframe architecture and other equivalent architectures. To be specific, the CPU 11 of the server 1 determines, based on the change bit (C) of the key storage 13, whether there is the change in the physical page and whether the write to the swap file 15 is finished, and executes the dump process by selecting the physical page not yet written to the dump storage 16. According to the embodiment 2, the processor based on an architecture not including the change bit (C) of the key storage 13 associated with the physical page executes the same dump process as in the embodiment 1. The server 1A according to the embodiment 2 I substantially the same as the server 1 according to the embodiment 1 except a difference of the processor's architecture. This being the case, the same components of the embodiment 2 as those of the embodiment 1 are marked with the same symbols and numerals, and the repetitive explanations thereof are omitted.

Figure 18:
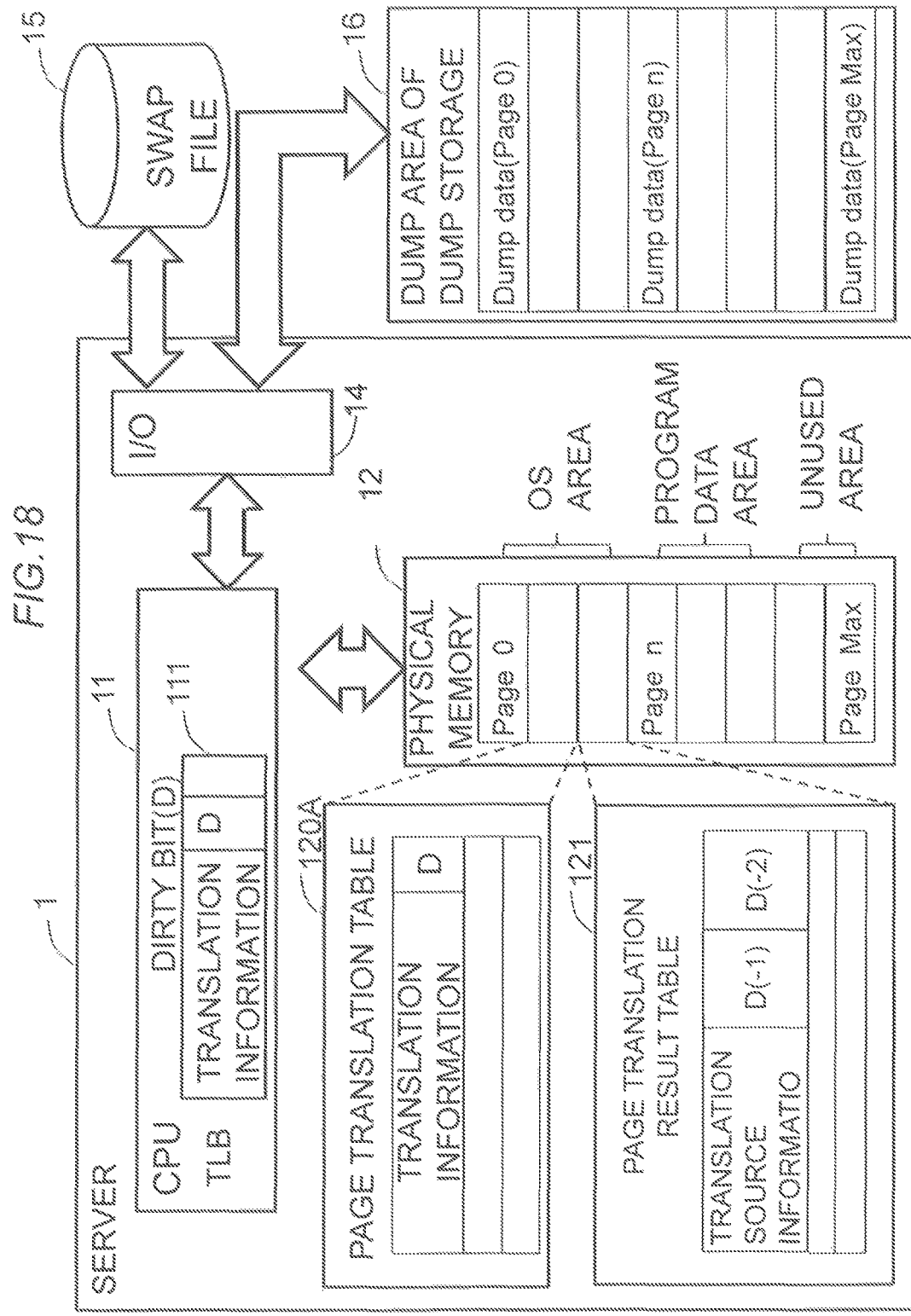
FIG. 18 is a diagram illustrating a configuration of the server according to an embodiment 2.

FIG. 18 is a diagram illustrating a configuration of the server 1A by way of one example of the information processing system according to the embodiment 2. The server 1A is different from the server 1 according to the embodiment 1 in terms of not including the key storage 13 of the server 1 but setting a dirty bit (D) in a page translation table 120A. The dirty bit (D) is retained also within the CPU 11 as part of the TLB 111. Other components of the server 1A are the same as those of the server 1 according to the embodiment 1.

Figure 19:
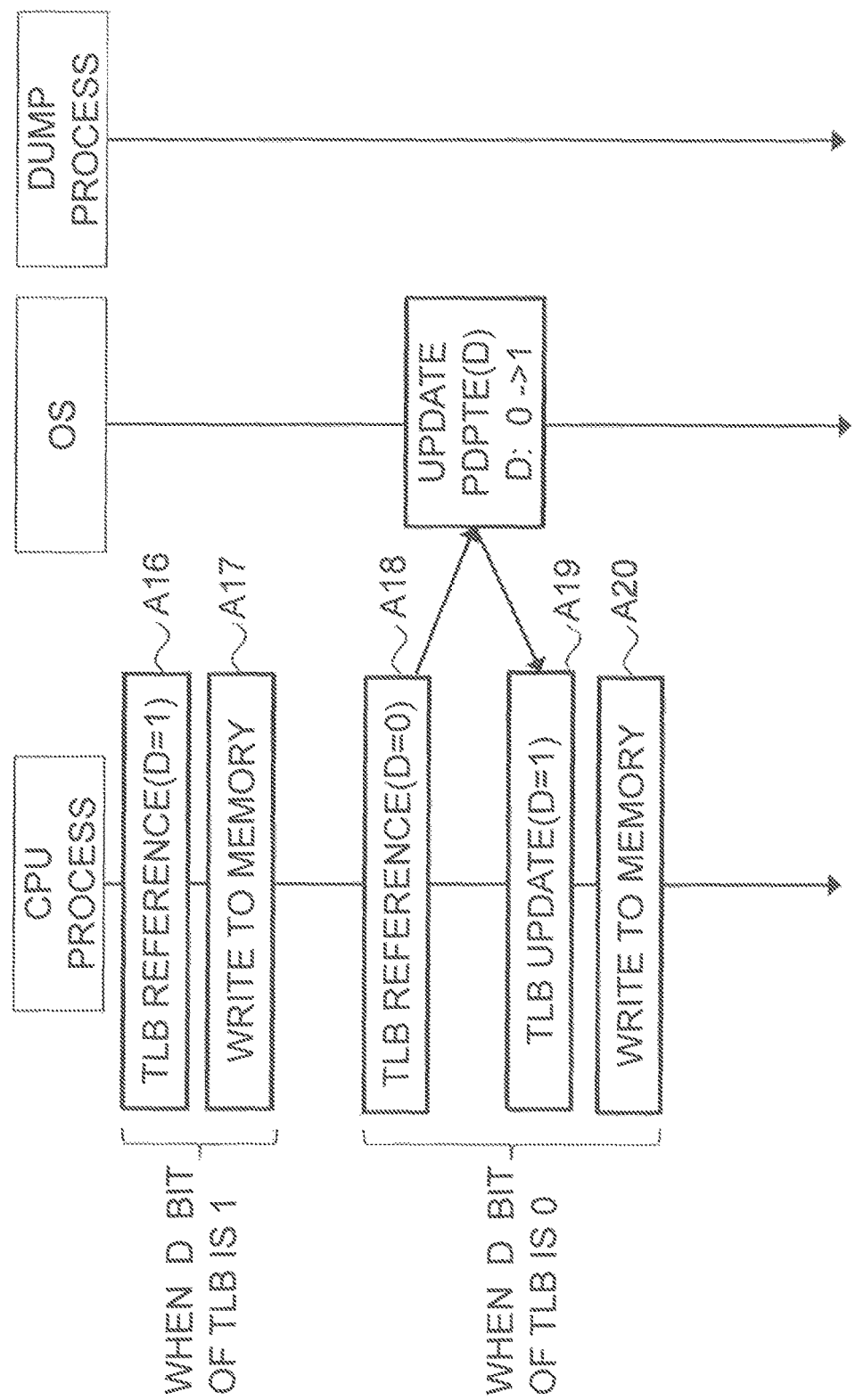
FIG. 19 is a diagram illustrating processes of the hardware circuit of the CPU in relation to a dirty bit (D)

FIG. 19 illustrates processes of a hardware control circuit of the CPU 11 in relation to the dirty bit (D). Note that A16 and A17 are the same as A6 and A7 in the embodiment 1 (FIG. 7), and the repetitive explanations thereof are omitted. As a result of referring to TLB 111 (A18), copy information of the dirty bit (D) indicates "0", in which case the CPU 11 at first requests the OS to set a PTDTE dirty bit (PTDTE(D)) in an already written status (=1) through the interrupt and other equivalent events. When the control is returned from the OS, the CPU 11 sets the copy (D) of the dirty bit on the TLB in the already written status (=1) (A19). The CPU 11 performs writing to the physical memory 12 (A20).

Specifically, the CPU 11 based on the architecture not including the key storage 13 requests, when writing to the physical memory 12, the OS to set the dirty bit (PTDTE(D)) to "1" in the page translation table 120A. The CPU 11 can reduce a change count of the dirty bit (PTDTE(D)) and a change request count for the OS by referring to the copy information of the dirty bit (D) copied to the TLB 111.

Figure 20:
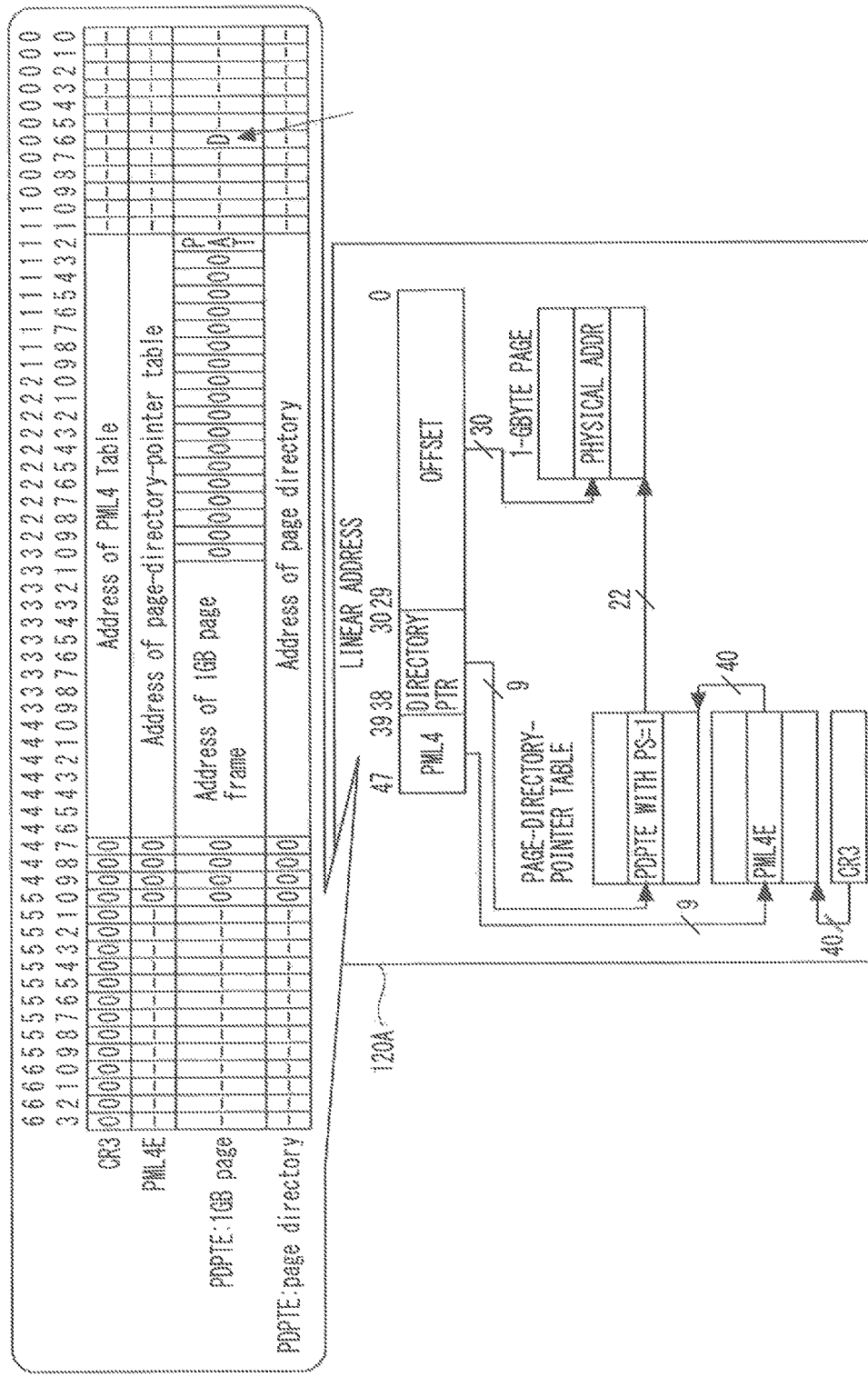
FIG. 20 is a diagram illustrating a structure of a page translation table.

FIG. 20 is a diagram illustrating a structure of the page translation table 120A. In the page translation table 120A, a seventh bit (indicated by an arrowhead and given in an entry specified by a bit "6") counted from the lowest bit in the PDPTE is used as the dirty bit (D). Other elements of the page translation table 120A are the same as the elements of the page translation table 120 according to the embodiment 1.

Figure 21:
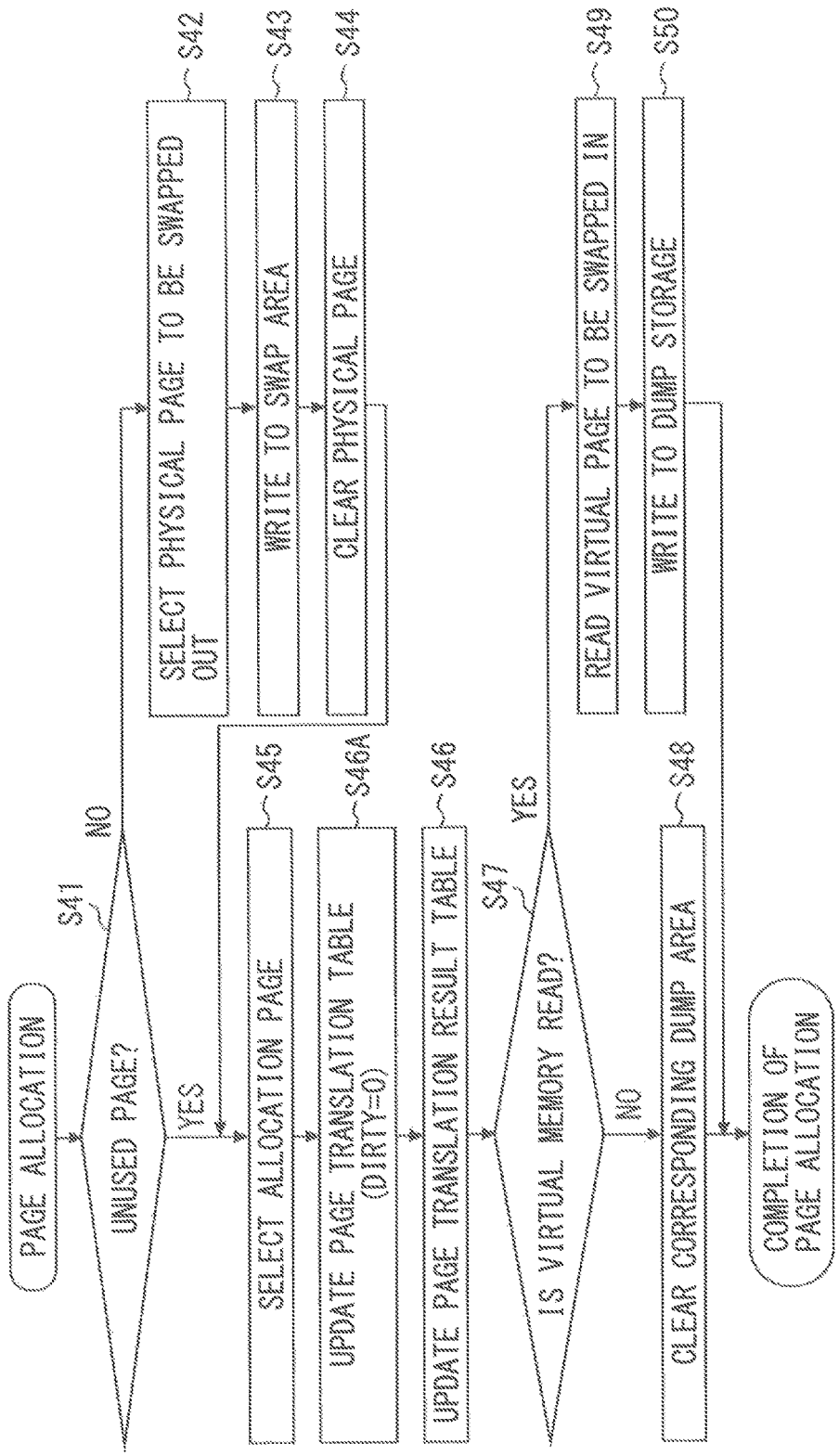
FIG. 21 is a flowchart illustrating a page allocation process in the embodiment 2.

FIG. 21 is a flowchart illustrating a page allocation process in the embodiment 2. The embodiment 2 does not contain the existence of the key storage 13 possessed by the server 1 according to the embodiment 1, and therefore does not include the process in S51 of FIG. 13, i.e., the process of clearing the change bit (C) of the key storage 13. In place of the process in S51, the page allocation process according to the embodiment 2 involves updating, after selecting the allocation page (S45), the page translation table 120A, and clearing the dirty bit (D)(S46A). Other processes of the page allocation process (FIG. 21) according to the embodiment 2 are the same as in FIG. 13 of the embodiment 1, and hence the repetitive explanations thereof are omitted. Processes in S46A, S49 and S50 are one example in which "the processor ensures an area of the physical memory, corresponding to an area of a virtual memory in a virtual memory system, then records, when reading storage information saved in the saving device and associated with the area of the virtual memory, the readout storage information to the recording device, and clears the flag associated with the area of the physical memory associated with the area of the virtual memory".

Figure 22:
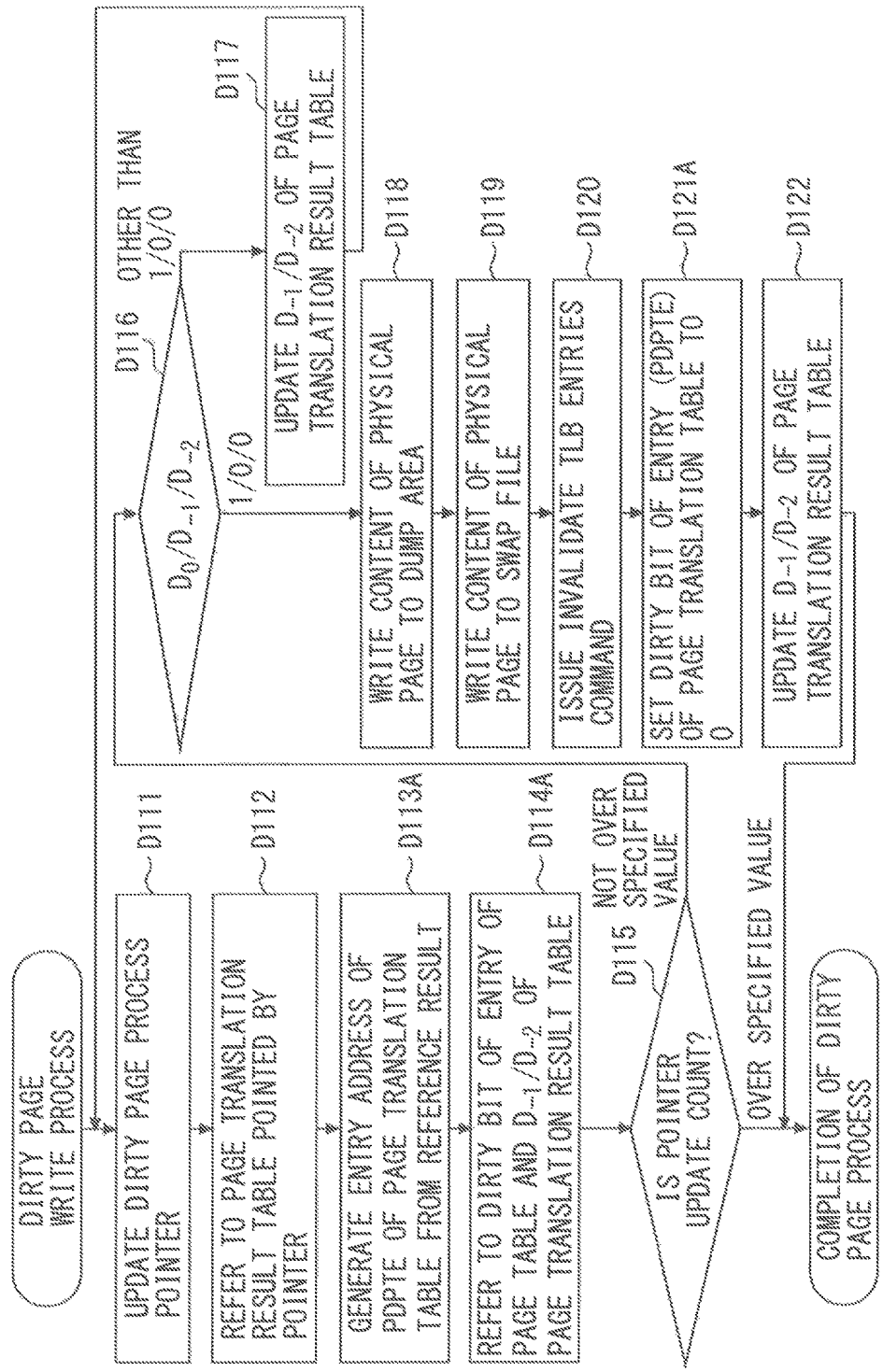
FIG. 22 is a flowchart illustrating a dirty page write process in the embodiment 2.

FIG. 22 illustrates a dirty page write process according to the embodiment 2. The dirty page write process of the embodiment 2 is substantially the same as the dirty page write process of the embodiment 1 (FIG. 15) except processes in D113A, D114A and D121A. To be specific, in the embodiment 2, the CPU 11 refers to, e.g., the page translation result table 121 along the dirty page process pointer (see FIG. 10), and thus generates an address of the PDPTE storing the dirty bit (D) in the page translation table 120A (D113A). The CPU 11 acquires the dirty bit (D) from the PDPTE, and also acquires the histories "$D_{-1}/D_{-2}$" of the page translation result table (D114A).

According to the embodiment 2, the CPU 11 writes the content of the physical page to the dump area of the dump storage 16 (D118), and, after getting coincident with the swap file 15 (D119), clears the dirty bit of the PDPTE of the page translation table 120A (D121A). In the dirty page write process (FIG. 22) according to the embodiment 2, the processes other than D113A, D114A and D121A are the same as those in FIG. 15 according to the embodiment 1, and hence the repetitive explanations thereof are omitted. The process in D121A is one example of "clearing the first flag so as to indicate the first area not being updated".

FIG. 23 illustrates a memory dump process in the embodiment 2. In this process, the CPU 11 at first updates the dirty page process pointer (D131). Next, the CPU 11 generates the address of the PDPTE in the page translation table 120A from the entry of the page translation result table 121, which is associated with the physical page pointed by the dirty page process pointer (D133). The CPU 11 refers to the dirty bit from the PDPTE in the page translation table 120A (D134). The CPU 11 determines whether the dirty bit is "1" (rewritten) (D135). When the dirty bit is "1" and when the physical page is rewritten, the CPU 11 writes the content of the physical page to the dump area of the dump storage 16 (D136). The CPU 11 0-clears the dirty bit of the PDPTE in the page translation table 120A (D137). The CPU 11 determines whether all the physical pages are finished (D138). When all the physical pages are not finished, the CPU 11 loops back to the process in D131. Whereas when all the physical pages are finished, the CPU 11 CPU 11 finishes processing. The processes in D135 and D136 are one example of "a second process of recording, to the recording device, storage information stored in a second area associated with a second flag indicating the second area being updated when the fault occurs".

As described above, even when the architecture of the processor does not contain the change bit (C) of the key storage 13, the server 1A according to the embodiment 2 executes the processes equivalent to those of the server 1 of the embodiment 1 by using the dirty bit in the page translation table 120A, and can attain the same effect as the effect described in <Effect of Embodiment 1>. For example, the server 1A can also speed up the dump as by the server 1 when the fault occurs.

<Non-Transitory Computer Readable Recording Medium>

A program making a computer, other machines and apparatuses (which will hereinafter be referred to as the computer and other equivalent apparatuses) attain any one of the functions, can be recorded on a non-transitory recording medium readable by the computer and other equivalent apparatuses. The computer and other equivalent apparatuses are made to read and run the program on this non-transitory recording medium, whereby the function thereof can be provided.

Herein, the non-transitory recording medium readable by the computer and other equivalent apparatuses connotes a non-transitory recording medium capable of accumulating information instanced by data, programs and other equivalent information electrically, magnetically, optically, mechanically or by chemical action, which can be read from the computer and other equivalent apparatuses. Among these non-transitory recording mediums, the mediums removable from the computer and other equivalent apparatuses are exemplified by a flexible disc, a magneto-optic disc, a CD-ROM, a CD-R/W, a DVD, a Blu-ray disc, a DAT, an 8 mm tape, and a memory card like a flash memory. A hard disc, a ROM (Read-Only Memory) and other equivalent recording mediums are given as the non-transitory recording mediums fixed within the computer and other equivalent apparatuses. Further, a Solid State Drive (SSD) is also available as the non-transitory recording medium removable from the computer and other equivalent apparatuses and also as the non-transitory recording medium fixed within the computer and other equivalent apparatuses.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An information processing system comprising:
a physical memory to be partitioned into a plurality of areas and to store storage information;
a flag storage unit to store a plurality of flags wherein a flag is set as indicating an area being updated when storage information stored in the area of the plurality of areas is updated, the area being associated with the flag;
a recording device configured to record any of the storage information stored in the plurality of areas;
a saving device configured to save any of the storage information stored in the physical memory as information in a virtual memory system; and
a processor,
the processor executing a first process of recording, when any fault does not occur, storage information stored in a first area to the recording device, the first area being associated with a first flag indicating the first area being updated, and a process of saving, in the saving device, the storage information stored in the first area, and clearing the first flag so as to indicate the first area not being updated,
the processor further executing a second process of recording, to the recording device, storage information stored in a second area associated with a second flag indicating the second area being updated when the fault occurs.

2. The information processing system according to claim 1, wherein the processor further executes a process of saving a history of a set value of each of the plurality of flags, and the processor does not execute the first process for an area with an update frequency being determined from a history of a set value of a flag associated with the area, the update frequency exceeding a predetermined limit upon reading the history of the set value of the flag.

3. The information processing system according to claim 1, wherein the processor sequentially executes the first process per single area or per plurality of areas of the physical memory to restrict a load caused by one execution of the first process to a predetermined limit.

4. The information processing system according to claim 1, wherein the processor ensures an area of the physical memory, corresponding to an area of a virtual memory in a virtual memory system, then records, when reading storage information saved in the saving device and associated with the area of the virtual memory, the storage information being read, to the recording device, and clears a flag associated with the area of the physical memory associated with the area of the virtual memory.

5. An information processing apparatus comprising:
a physical memory to be partitioned into a plurality of areas and to store storage information;
a flag storage unit to store a plurality of flags wherein a flag is set as indicating an area being updated when storage information stored in the area of the plurality of areas is updated, the area being associated with the flag; and
a processor,
the processor executing a first process of recording, when any fault does not occur, storage information stored in a first area to a recording device, the first area being associated with a first flag indicating the first area being updated, and a process of saving, in a saving device configured to save any of the storage information stored in the physical memory as information in a virtual memory system, the storage information stored in the first area, and clearing the first flag so as to indicate the first area not being updated,
the processor further executing a second process of recording, to the recording device, storage information stored in a second area associated with a second flag indicating the second area being updated when the fault occurs.

6. An information processing method executed by a computer including a physical memory partitioned into a plurality of areas and to store storage information, comprising:
a process of referring to at least one of a plurality of flags wherein a flag is set as indicating an area being updated when storage information stored in the area of the plurality of areas is updated, the area being associated with the flag;
a first process of recording, when any fault does not occur, storage information stored in a first area to a recording device, the first area being associated with a first flag indicating the first area being updated,
a process of saving, in a saving device configured to save any of the storage information stored in the physical memory as information in a virtual memory system, the storage information stored in the first area, and clearing the first flag so as to indicate the first area not being updated; and
a second process of recording, to the recording device, storage information stored in a second area associated with a second flag indicating the second area being updated when the fault occurs.

7. A computer-readable non-transitory storage medium storing program for making a computer including a physical memory partitioned into a plurality of areas and to store storage information, execute:
a process of referring to at least one of a plurality of flags wherein a flag is set as indicating an area being updated when storage information stored in the area of the plurality of areas is updated, the area being associated with the flag;
a first process of recording, when any fault does not occur, storage information stored in a first area to a recording device, the first area being associated with a first flag indicating the first area being updated, a process of saving, in a saving device configured to save any of the storage information stored in the physical memory as information in a virtual memory system, the storage information stored in the first area, and clearing the first flag so as to indicate the first area not being updated; and a second process of recording, to the recording device, storage information stored in a second area associated with a second flag indicating the second area being updated when the fault occurs.

* * * * *